(12) United States Patent
Lee

(10) Patent No.: US 11,722,218 B2
(45) Date of Patent: *Aug. 8, 2023

(54) IMAGE DISPLAY DEVICE AND OPERATION METHOD THEREOF

(71) Applicant: SAMSUNG ELECTRONICS CO., LTD., Suwon-si (KR)

(72) Inventor: Haekwang Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

This patent is subject to a terminal disclaimer.

(21) Appl. No.: 17/480,955

(22) Filed: Sep. 21, 2021

(65) Prior Publication Data

US 2022/0006526 A1 Jan. 6, 2022

Related U.S. Application Data

(63) Continuation of application No. 16/731,170, filed on Dec. 31, 2019, now Pat. No. 11,133,867.

(30) Foreign Application Priority Data

Jan. 8, 2019 (KR) .................. 10-2019-0002398

(51) Int. Cl.
*H04B 10/114* (2013.01)
*H04N 21/41* (2011.01)
(Continued)

(52) U.S. Cl.
CPC ..... *H04B 10/1143* (2013.01); *H04N 21/4108* (2013.01); *H04N 21/42204* (2013.01); *H04N 21/43632* (2013.01)

(58) Field of Classification Search
CPC ........... H04B 10/1143; H04N 21/4108; H04N 21/42204; H04N 21/42224;
(Continued)

(56) References Cited

U.S. PATENT DOCUMENTS 9,106,337 B2 8/2015 Jung et al.
10,110,843 B2 10/2018 Kim et al.
(Continued)

FOREIGN PATENT DOCUMENTS

CN 1968348 A 5/2007
CN 103136928 A 6/2013
(Continued)

OTHER PUBLICATIONS

Communication dated Mar. 22, 2022 issued by Intellectual Property India in Indian Application No. 202117034218.
(Continued)

*Primary Examiner* — Omar S Ismail
(74) *Attorney, Agent, or Firm* — Sughrue Mion, PLLC

(57) ABSTRACT

An image display device configured to obtain device identification information corresponding to a peripheral device connected to the image display device and control a wireless communicator to transmit search data corresponding to the peripheral device to a control device of the image display device based on the device identification information, and to determine pairing data and control code information corresponding to the peripheral device, based on the device identification information, upon receiving response data from the control device, and transmit the pairing data and the control code information to the control device through the wireless communicator.

20 Claims, 18 Drawing Sheets

(51) Int. Cl.
*H04N 21/422* (2011.01)
*H04N 21/4363* (2011.01)

(58) Field of Classification Search
CPC ....... H04N 21/42225; H04N 21/43632; H04N 21/44008
See application file for complete search history.

(56) References Cited

U.S. PATENT DOCUMENTS

| | | | |
|---|---|---|---|
| 10,148,900 | B2 | 12/2018 | Wang |
| 10,347,120 | B2 | 7/2019 | Kim et al. |
| 10,778,927 | B2 | 9/2020 | Yoon et al. |
| 2005/0166241 | A1* | 7/2005 | Kim .................. H04N 21/4108 725/78 |
| 2008/0134237 | A1* | 6/2008 | Tu ...................... H04N 7/1675 725/38 |
| 2010/0302461 | A1* | 12/2010 | Lim .................... H04N 21/488 715/705 |
| 2014/0033253 | A1* | 1/2014 | Cho ..................... G06F 3/0346 725/37 |
| 2014/0310742 | A1* | 10/2014 | Kim .................... H04N 21/485 725/110 |
| 2015/0137959 | A1 | 5/2015 | Kim et al. |
| 2015/0179061 | A1 | 6/2015 | Kim et al. |
| 2015/0201148 | A1* | 7/2015 | Kim .................. H04N 21/4532 725/43 |
| 2016/0269677 | A1* | 9/2016 | Lee .................... H04N 7/0122 |
| 2017/0048577 | A1 | 2/2017 | Chiou et al. |
| 2017/0075641 | A1* | 3/2017 | Kwon ............. H04N 21/42224 |
| 2017/0105046 | A1* | 4/2017 | Shin .................... G05B 19/042 |
| 2017/0185276 | A1* | 6/2017 | Lee .................. H04N 21/4131 |
| 2017/0195609 | A1 | 7/2017 | Kim et al. |
| 2017/0286047 | A1* | 10/2017 | Patil ................. H04N 21/41265 |
| 2018/0152821 | A1* | 5/2018 | Sa ......................... G06F 21/84 |
| 2018/0270525 | A1 | 9/2018 | Yu et al. |

FOREIGN PATENT DOCUMENTS

| | | |
|---|---|---|
| CN | 105338385 A | 2/2016 |
| CN | 107534788 A | 1/2018 |
| CN | 107636749 A | 1/2018 |
| CN | 207802213 U | 8/2018 |
| CN | 108513152 A | 9/2018 |
| EP | 3 190 571 A1 | 7/2017 |
| EP | 3 193 497 A1 | 7/2017 |
| EP | 3 367 693 A1 | 8/2018 |
| JP | 2017-38345 A | 2/2017 |
| KR | 10-2005-0096239 A | 10/2005 |
| KR | 10-2015-0056273 A | 5/2015 |
| KR | 10-2015-0071944 A | 6/2015 |
| KR | 10-2015-0099940 A | 9/2015 |
| KR | 10-2017-0045596 A | 4/2017 |
| WO | 03067543 A2 | 8/2003 |

OTHER PUBLICATIONS

International Search Report (PCT/ISA/210) and Written Opinion (PCT/ISA/237) dated Apr. 3, 2020 issued by the International Searching Authority in International Application No. PCT/KR2019/018307.
Communication dated Apr. 20, 2020, issued by the European Patent Office in counterpart European Application No. 20150025.3.
Communication dated Jul. 2, 2021 issued by the State Intellectual Property Office of the P.R. China in Chinese Application No. 202010017008.4.
Notice of Allowance issued in parent U.S. Appl. No. 16/731,170 dated May 21, 2021.
Non-Final Office Action issued in parent U.S. Appl. No. 16/731,170 dated Feb. 12, 2012.
Communication dated Nov. 24, 2021 issued by the State Intellectual Property Office of P.R. China in counterpart Chinese application No. 202010017008.4
Communication dated Oct. 3, 2022, issued by the Japan Patent Office in Japanese Patent Application No. 2021-539672.

* cited by examiner

FIG. 5A
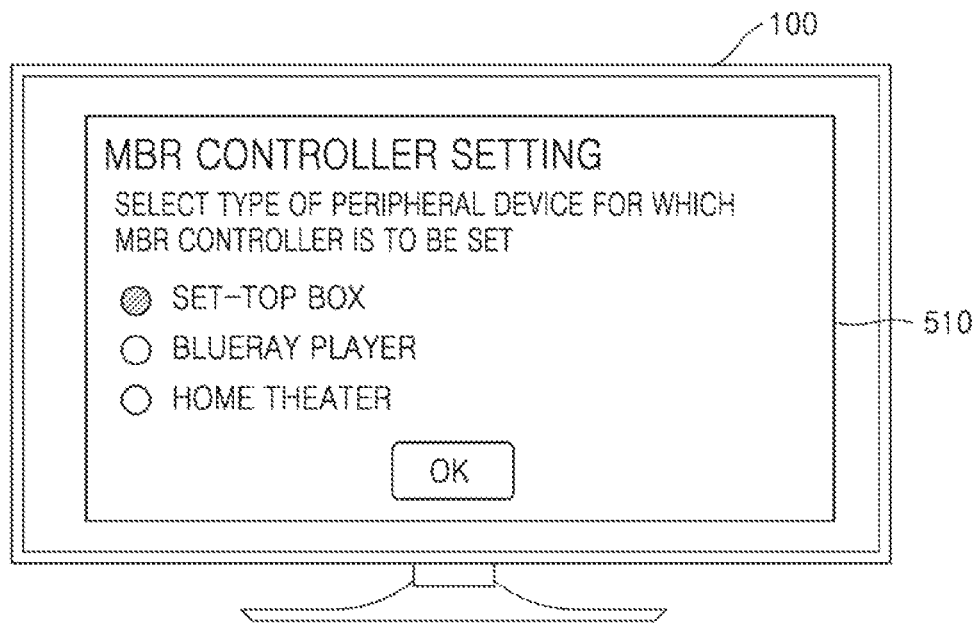
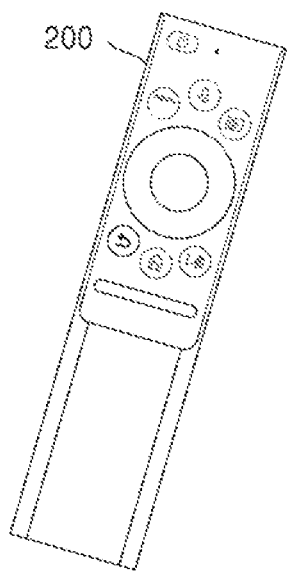

FIG. 5B
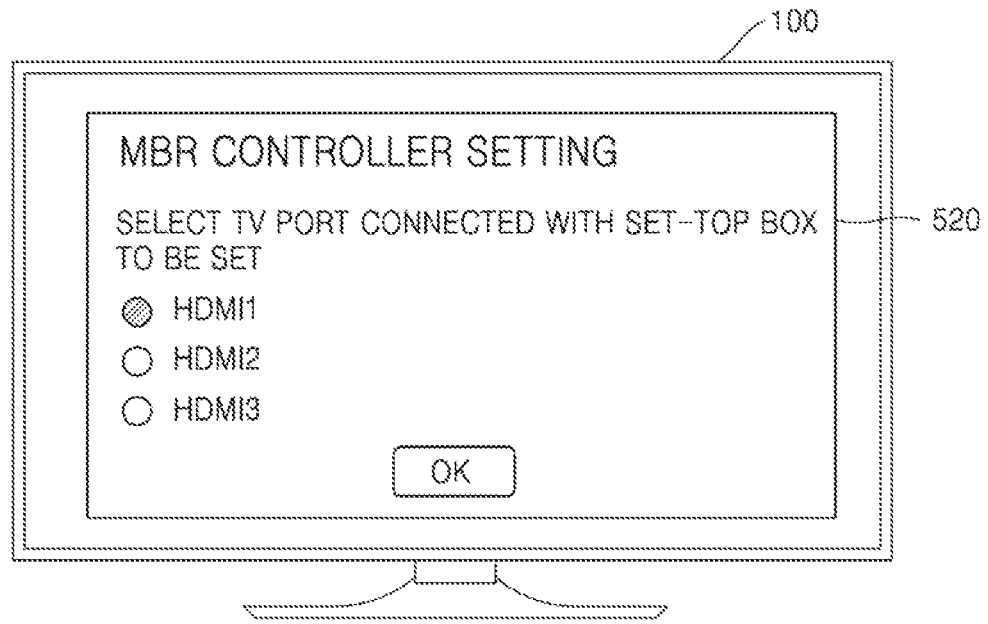
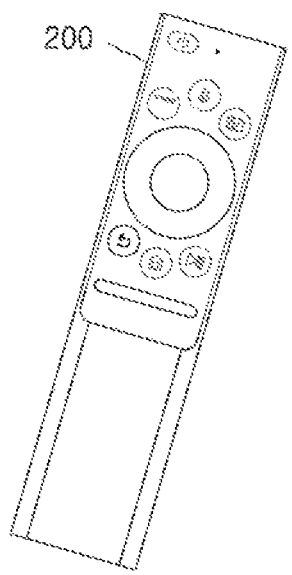

FIG. 5C
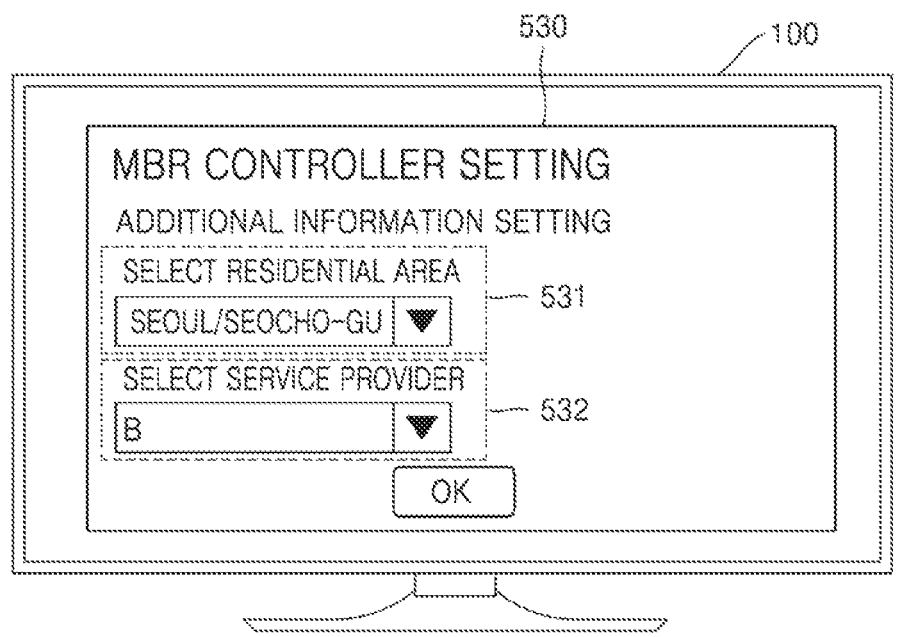
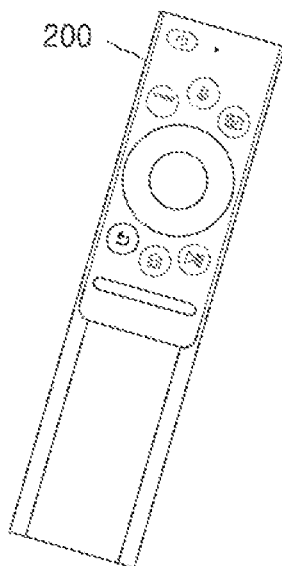

FIG. 5D
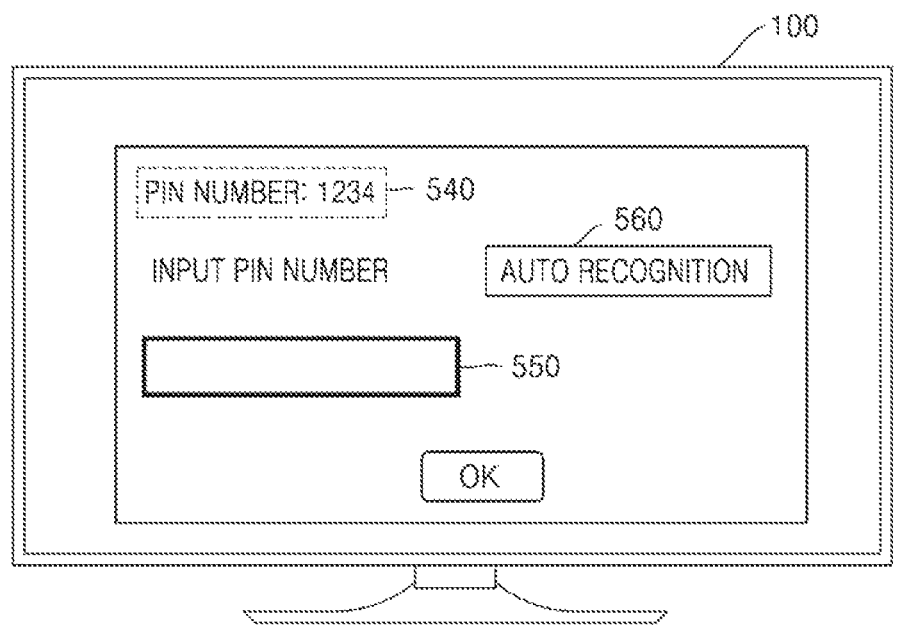
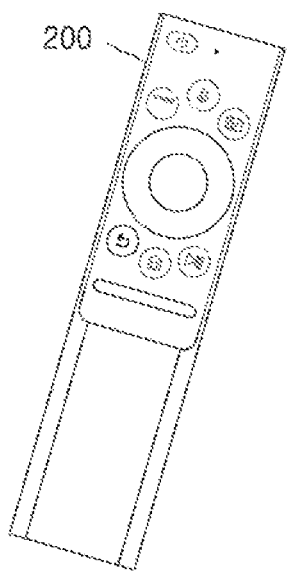

FIG. 5E
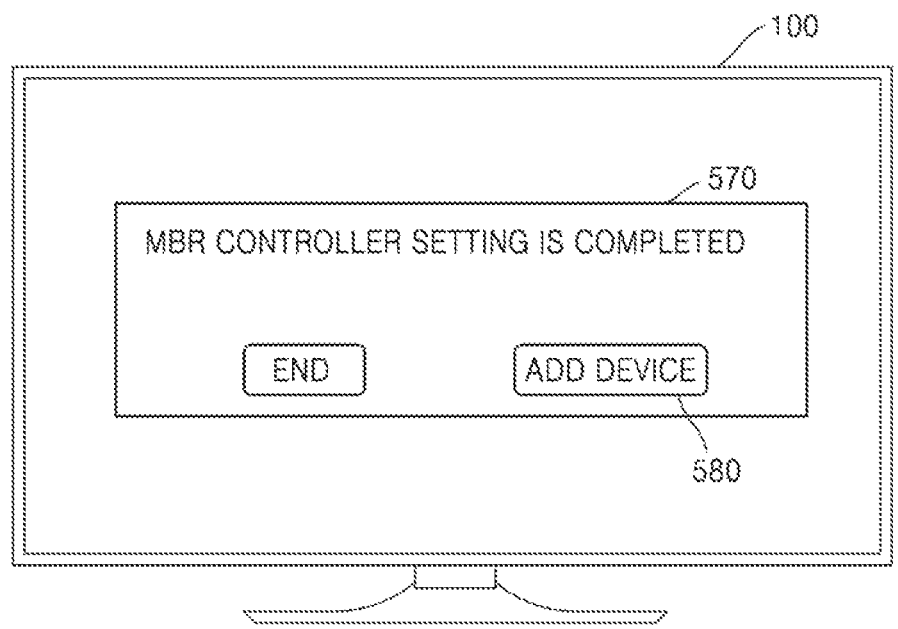
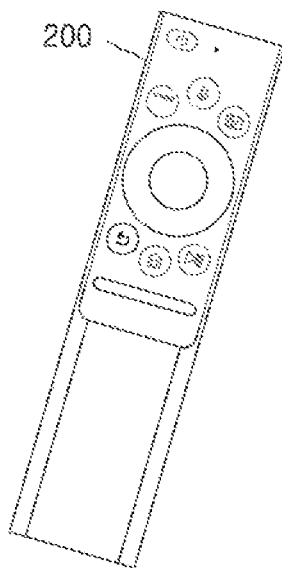

FIG. 5F
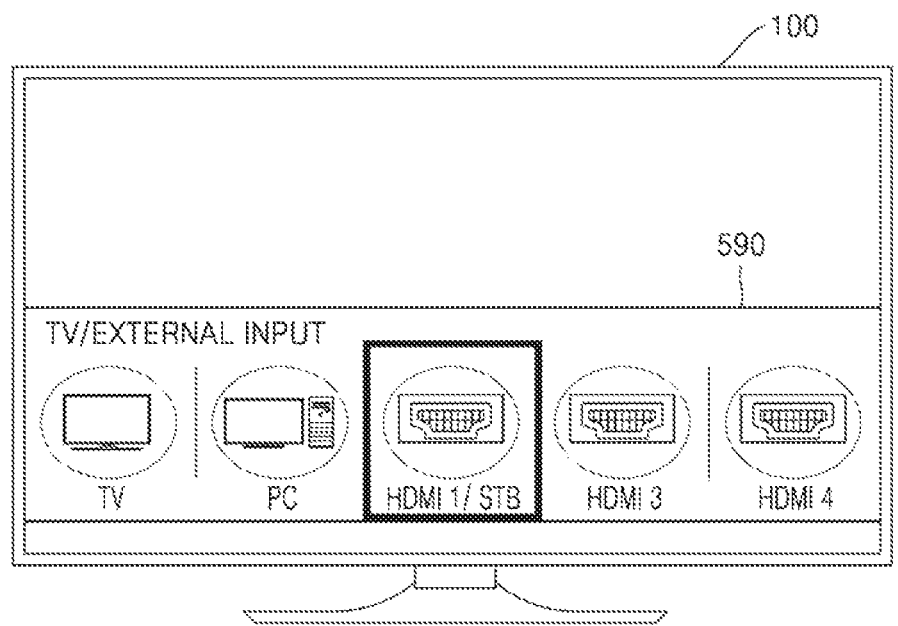
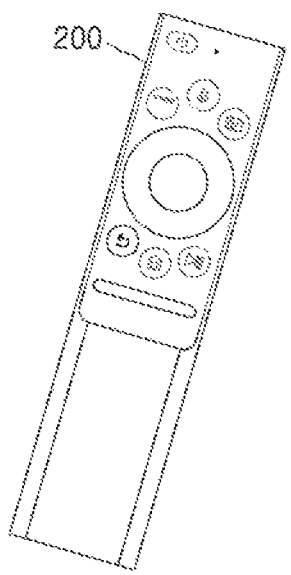

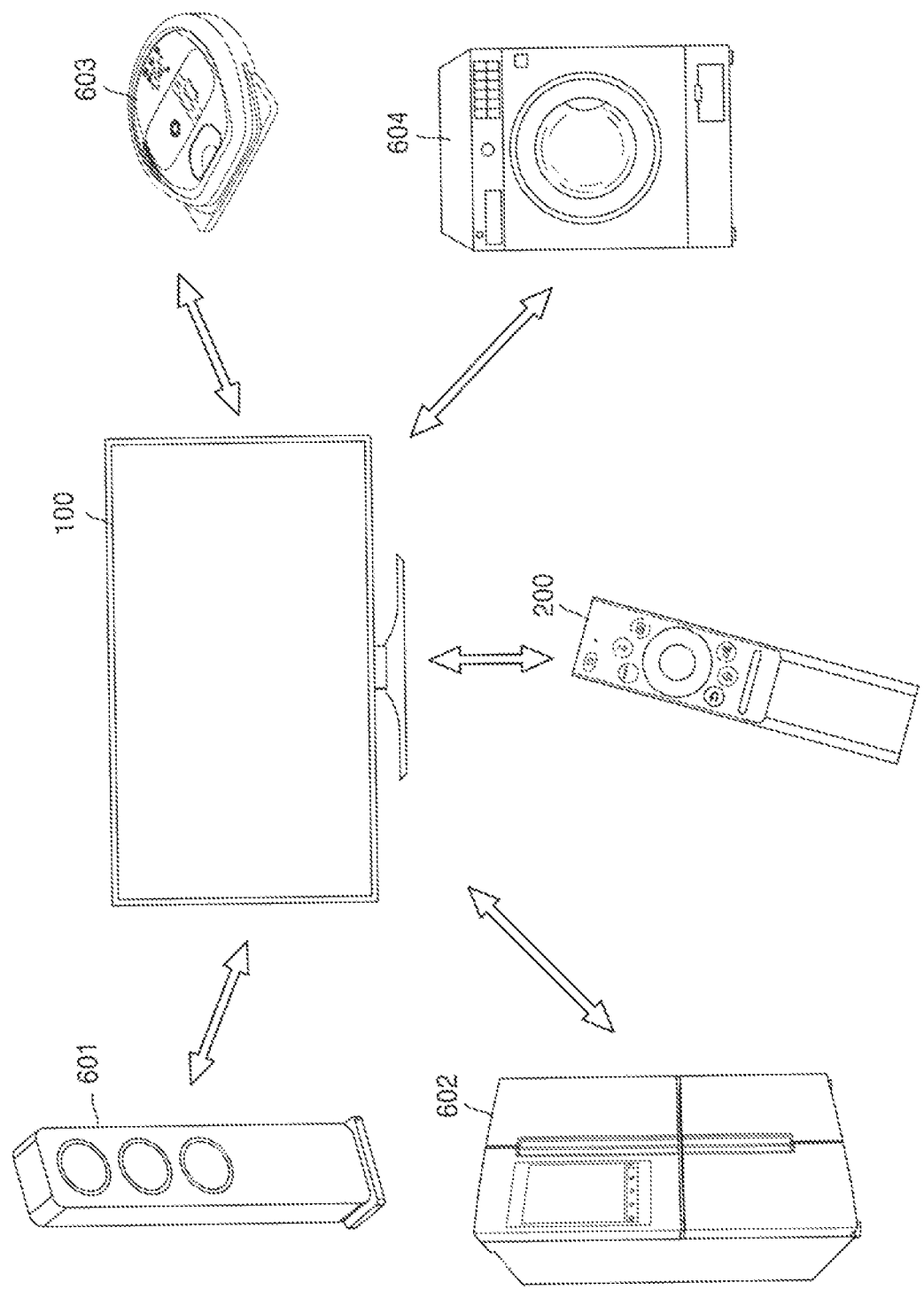

FIG. 7A
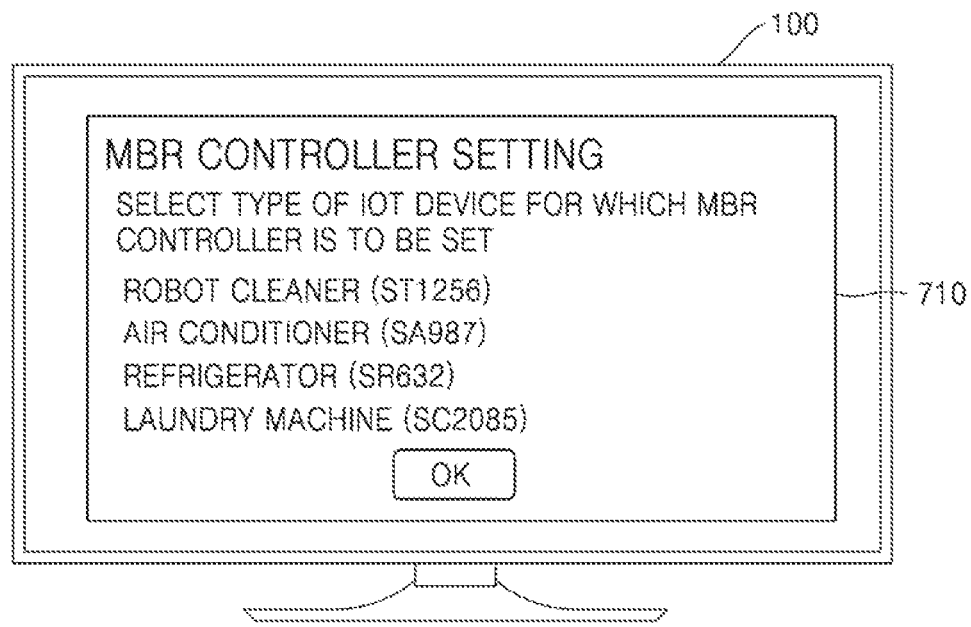
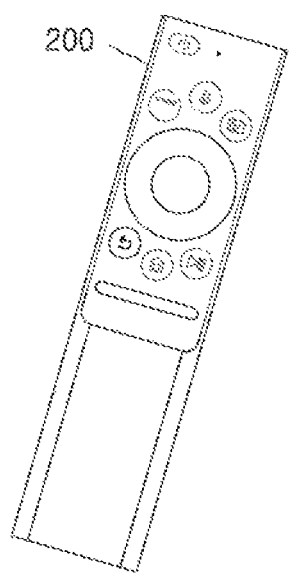

FIG. 7B
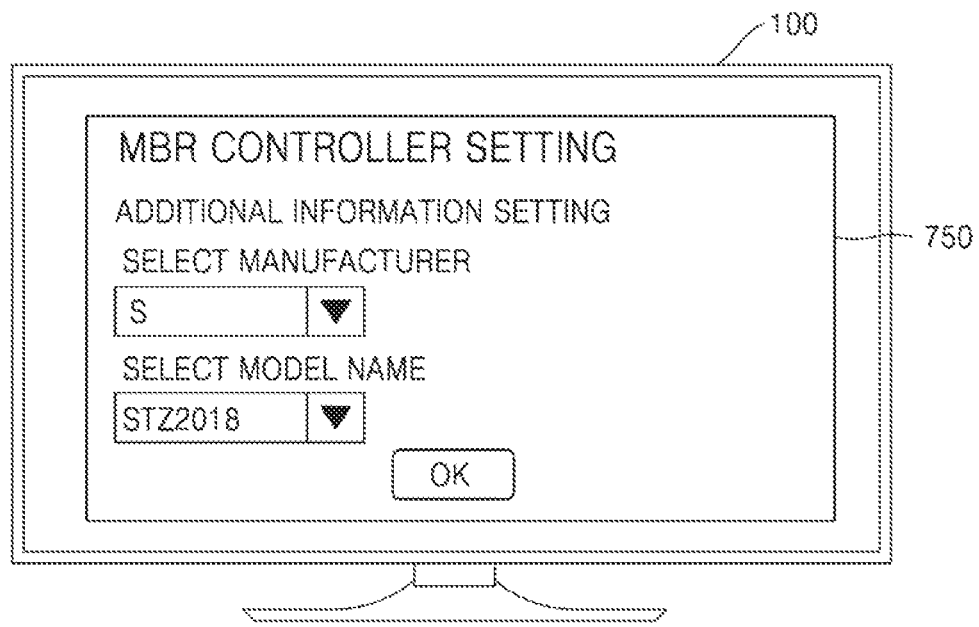
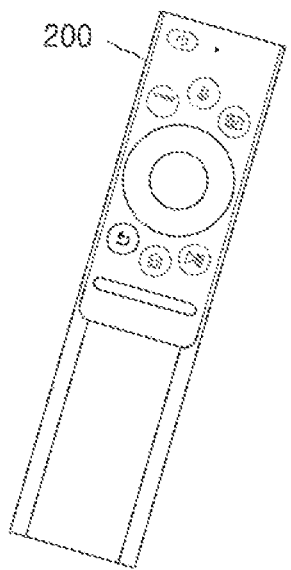

FIG. 8A
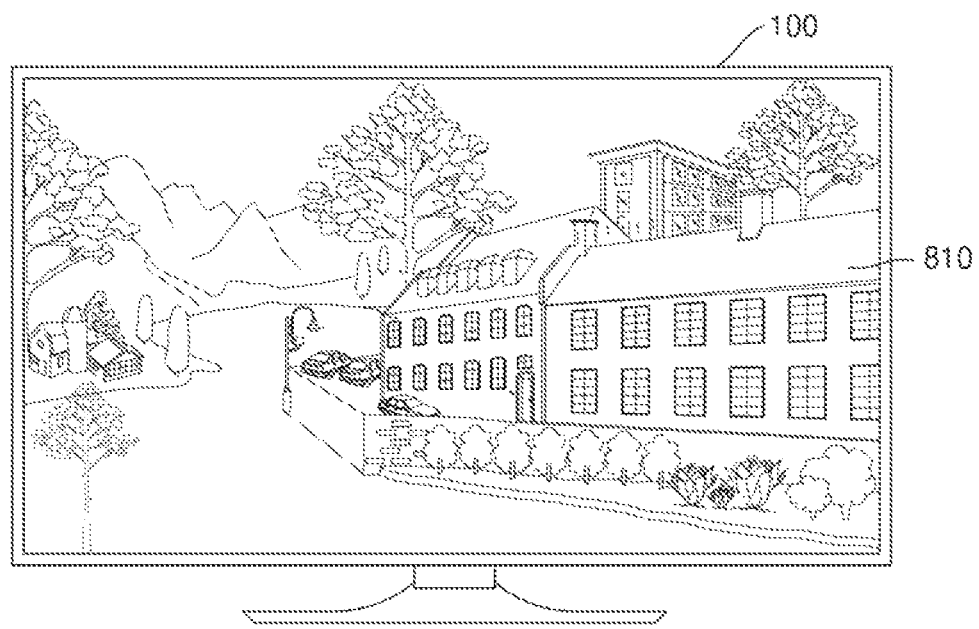
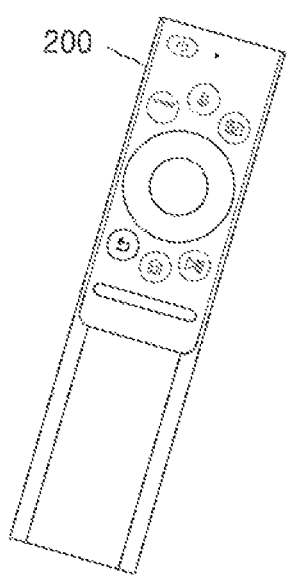

IMAGE DISPLAY DEVICE AND OPERATION METHOD THEREOF

CROSS-REFERENCE TO RELATED APPLICATION

This application is continuation of U.S. application Ser. No. 16/731,170 filed Dec. 31, 2019, which is based on and claims priority under 35 U.S.C. § 119 to Korean Patent Application No. 10-2019-0002398, filed on Jan. 8, 2019, in the Korean Intellectual Property Office, the disclosures of which are incorporated by reference herein in their entirety.

BACKGROUND

1. Field

Various embodiments of the disclosure relate to an image display device and an operation method thereof, and more particularly, to an image display device capable of conveniently setting a multi-brand remote (MBR) controller that controls the image display device and a peripheral device connected to the image display device, and a method of operating the image display device.

2. Description of the Related Art

Image display devices have functions of reproduce images that users may view. For example, users may watch broadcasts through the image display devices. The image display devices display broadcasts selected by the user from among broadcast signals transmitted from a broadcasting station.

Moreover, smart televisions (TVs) providing a variety of content in addition to broadcasting functions have been developed. Instead of passively operating based on selection of a user, smart TVs analyze and automatically provide content customized to desires of the user.

Meanwhile, when peripheral devices such as a set-top box, a Blue-ray disc player, a digital versatile disk (DVD) player, a streaming device, a home theater, an audio device, etc., are connected to an image display device such as a TV, various connected devices may be controlled by one remote controller by using a multi-brand remote (MBR) control function of a TV remote controller. The TV remote controller may generate an infrared (IR) signal for a peripheral device that is manipulated in an IR to automatically set the MBR control function of the TV remote controller according to whether the peripheral device is manipulated based on the generated IR signal.

However, to set the MBR function for a peripheral device manipulated in a wireless communication such as ZigBee RF4CE, Bluetooth, etc., a pairing process for wireless communication between the TV remote controller and the peripheral device is needed, but a user may have difficulty identifying a peripheral device to be connected because the TV remote controller does not generally include a display and most TV viewers are located at long distances from the peripheral device. As a result, it is difficult to equally apply a pairing technique for wireless communication between mobile phones and wireless devices, mainly headphones/earphones supporting Bluetooth.

SUMMARY

Embodiments of the disclosure provide an image display device capable of conveniently setting multi-brand remote (MBR) controller that controls wirelessly connected peripheral device (e.g., ZigBee RF4CE or Bluetooth), and an a method of operating the image display device.

Additional aspects will be set forth in part in the description which follows and, in part, will be apparent from the description, or may be learned by practice of the embodiments of the disclosure.

According to an embodiment of the disclosure, there is provided an image display device including a memory having stored therein at least one instruction, a wireless communicator, and a processor, in which the processor is configured, by executing the at least one instruction stored in the memory, to obtain peripheral device identification information corresponding to a peripheral device connected to the image display device and control the wireless communicator to transmit search data corresponding to the peripheral device to a control device of the image display device based on the peripheral device identification information, and to determine pairing data and control code information corresponding to the peripheral device, based on the peripheral device identification information, upon receiving response data from the control device, and transmit the pairing data and the control code information to the control device through the wireless communicator, in which the response data includes a response with respect to the search data transmitted from the control device and corresponds to a response signal received from the peripheral device.

The search data according to an embodiment of the disclosure may include the peripheral device identification information.

The peripheral device according to an embodiment of the disclosure may be connected to the image display device through a high-definition multimedia interface (HDMI) port, and the peripheral device identification information corresponding to the peripheral device may be received through the HDMI port.

The peripheral device identification information corresponding to the peripheral device according to an embodiment of the disclosure may include at least one of a manufacturer, an operator name, or a model name of the peripheral device.

The processor according to an embodiment of the disclosure may be further configured to determine the peripheral device identification information corresponding to the peripheral device, based on location information of a region where the image display device is used.

The memory according to an embodiment of the disclosure may include a database storing in association the peripheral device identification information, search data, pairing data, and control code information, which correspond to each of a plurality of peripheral devices.

The processor according to an embodiment of the disclosure may be further configured to receive the database from an external server and store the database in the memory.

The image display device according to an embodiment of the disclosure may further include a display, in which the processor may be further configured to control the display to display an image based on an image signal received from the peripheral device, to extract identification code data by analyzing the image signal, and to transmit the extracted identification code data to the control device or the peripheral device through the wireless communicator.

The identification code data according to an embodiment of the disclosure may include data used in authentication during pairing between the control device and a peripheral device.

The processor according to an embodiment of the disclosure may be further configured to extract the identification code by analyzing the image signal, upon receiving second response data from the control device, in which the second response data may include a response with respect to the pairing data transmitted from the control device and corresponds to the response signal received from the peripheral device.

The processor according to an embodiment of the disclosure may be further configured to extract the identification code data by analyzing the image signal based on a user input.

According to an embodiment of the disclosure, there is provided a method of operating an image display device, the method including obtaining peripheral device identification information corresponding to a peripheral device connected to the image display device, transmitting search data corresponding to the peripheral device to a control device of the image display device, based on the peripheral device identification information, determining pairing data and control code information corresponding to the peripheral device, based on the peripheral device identification information, upon receiving response data from the control device, and transmitting the pairing data and the control code information to the control device, in which the response data includes a response with respect to the search data transmitted from the control device and corresponds to a response signal received from the peripheral device.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5A, 5B, 5C, 5D, and 5E are diagrams for describing a method, performed by an image display device, of setting an MBR controller, according to an embodiment of the disclosure;

FIG. 5F is a diagram for describing a method, performed by an image display device, of controlling a peripheral device by using an MBR controller, according to an embodiment of the disclosure;

FIG. 6 illustrates an image display device, a control device, and an Internet of Things (IoT) device, according to an embodiment of the disclosure;

FIGS. 7A and 7B are diagrams for describing a method, performed by an image display device, of setting an MBR controller for an IoT device, according to an embodiment of the disclosure;

FIGS. 8A and 8B are diagrams for describing a method of controlling an IoT device by using a control device, according to an embodiment of the disclosure;

DETAILED DESCRIPTION

Figure 1:
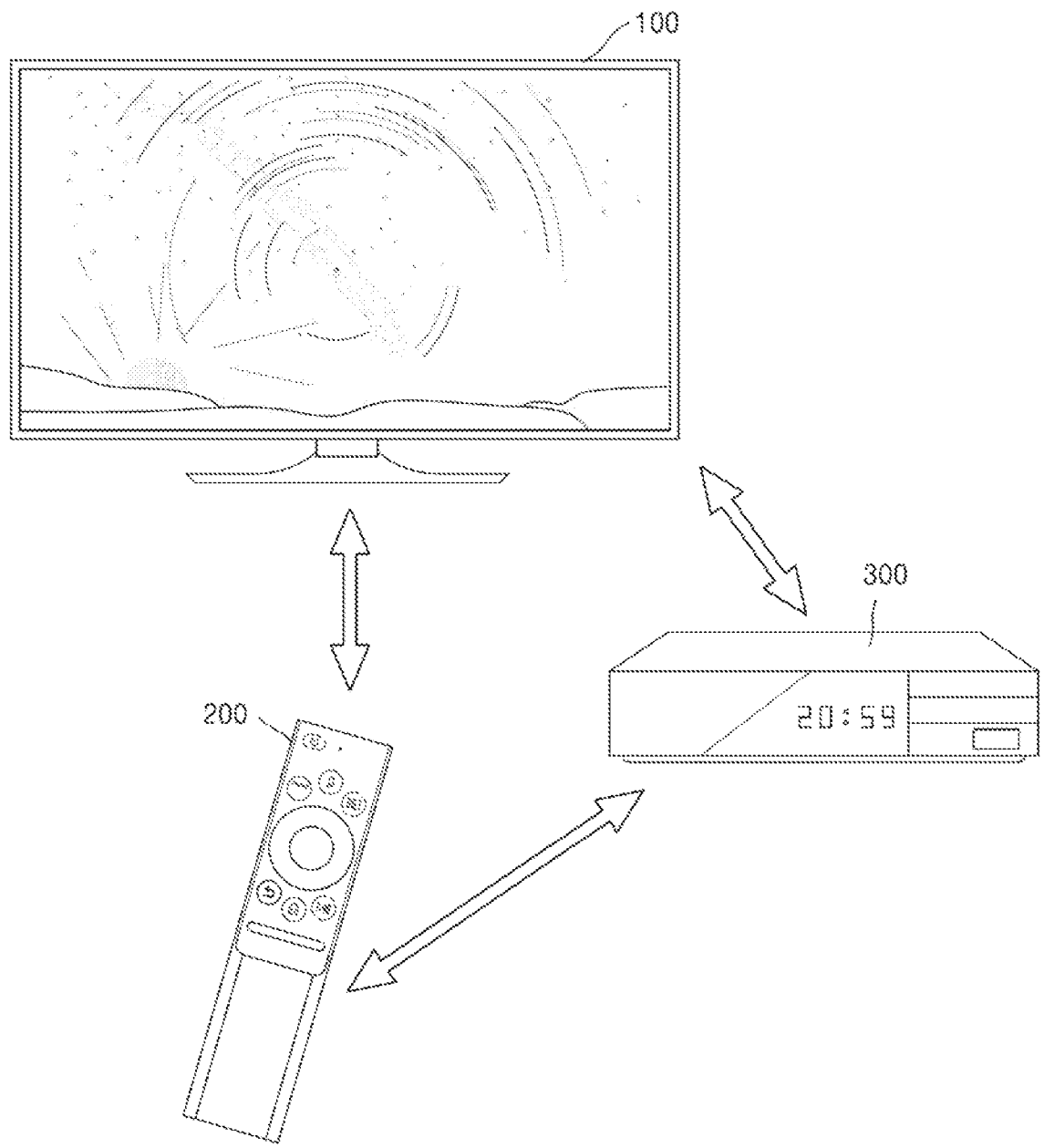
FIG. 1 illustrates a system including an image display device, a control device, and a peripheral device, according to an embodiment of the disclosure.

Terms used herein will be described in brief, and the disclosure will be described in detail.

Although terms used in the disclosure are selected according to general terms commonly used at present under the consideration of functions in the disclosure, the terms may vary according to the intention of those of ordinary skill in the art or introduction of new technology. In addition, in a specific case, specific terms may be selected, and in this case, the meaning of the terms is disclosed in a corresponding description part of the disclosure. Thus, the terms used in the disclosure should be defined not by the simple names of the terms but by the meaning of the terms and the contents throughout the disclosure.

Throughout the entirety of the specification of the disclosure, when it is assumed that a certain part includes a certain component, the term "including" means that a corresponding component may further include other components unless a specific contrary meaning is described. The term used in the embodiments of the disclosure such as "unit" or "module" indicates a unit for processing at least one function or operation, and may be implemented in hardware, software, or in a combination of hardware and software.

Hereinafter, embodiments of the disclosure will be described in detail with reference to the attached drawings to allow those of ordinary skill in the art to easily carry out the embodiments of the disclosure. However, the disclosure may be implemented in various forms, and are not limited to the embodiments of the disclosure described herein. To clearly describe the disclosure, parts that are not associated with the description have been omitted from the drawings, and throughout the specification, identical reference numerals refer to identical parts.

Throughout the disclosure, the expression "at least one of a, b or c" indicates only a, only b, only c, both a and b, both a and c, both b and c, all of a, b, and c, or variations thereof.

FIG. 1 illustrates a system of an image display device, a control device, and a peripheral device, according to an embodiment of the disclosure.

According to an embodiment of the disclosure, the image display device 100 may be, but is not limited to, a television (TV), and may be implemented in various forms including a display. For example, the image display device 100 may be implemented with various electronic devices that reproduce content to be displayed thereon such as a mobile phone, a tablet personal computer (PC), a digital camera, a camcorder, a laptop computer, a desktop, an electronic (e)-book terminal, a digital broadcasting terminal, a personal digital assistant (PDA), a portable multimedia player (PMP), a navigator, an MP3 player, a wearable device, and so forth. In particular, embodiments of the disclosure may be easily implemented in, but not limited to, a display device having a large-size display such as a TV.

The image display device 100 may be of a fixed type or a mobile type, and may be a digital broadcasting receiver capable of receiving digital broadcasting. The image display device 100 may be implemented as a flat display device or a curved display device provided with a screen having a curvature or a flexible display device having an adjustable curvature. An output resolution of the image display device 100 may include, for example, high definition (HD), full HD, ultra HD, or a resolution higher than ultra HD.

The peripheral device 300 according to an embodiment of the disclosure may be a playback device via which the image display device 100 reproduces multimedia contents. For example, the peripheral device 300 may include a set-top box, a Blue ray disk player, a DVD player, a streaming device, a home theater, an audio device, etc. The peripheral device 300 may be an IoT device. The peripheral device 300 may include a temperature sensor, a humidity sensor, a sound sensor, a motion sensor, a proximity sensor, a gas detection sensor, a heat detection sensor, a refrigerator, an air conditioner, a closed circuit TV (CCTV), a laundry machine, a vacuum cleaner, an oven, a dehumidifier, an electric light, a fire alarm, etc.

The peripheral device 300 may be implemented with various electronic devices such as a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a wearable device, and so forth.

The image display device 100 according to an embodiment of the disclosure may transmit and receive data, a signal, etc., by using wired or wireless communication. For example, the peripheral device 300 may transmit an image signal to the image display device 100, and then the image display device 100 may display an image based on the received image signal.

The control device 200 may be implemented with various forms of devices for controlling the image display device 100, like a remote controller or a mobile phone. The control device 200 according to an embodiment of the disclosure may control the image display device 100 by using control code or signaling information of the image display device 100. For example, the control device 200 may control the image display device 100 by using infrared (IR) signaling, and control the image display device 100 by using a Bluetooth (BT)signaling.

The control device 200 according to an embodiment of the disclosure may be set as a multi-brand remote (MBR) controller and thus may control the peripheral device 300 as well as the image display device 100. The peripheral device 300 according to an embodiment of the disclosure may be a device that supports a wireless communication scheme such as ZigBee RF4CE (hereinafter, RF4CE) or BT. To control the peripheral device 300 in the RF4CE by using the control device 200, pairing between the control device 200 and the peripheral device 300 is required. Thus, the control device 200 may perform pairing with the peripheral device 300, and upon successful pairing, control the peripheral device 300 in the RF4CE by using the control code information corresponding to the peripheral device 300.

When a plurality of peripheral devices supporting the RF4CEexist, the control device 200 may need to search for or discover a peripheral device that performs pairing before performing pairing. Thus, the control device 200 according to an embodiment of the disclosure may transmit a search or discovery signal corresponding to a peripheral device to peripheral devices, and receive a response signal from the peripheral device corresponding to the search signal among the peripheral devices.

In an embodiment of the disclosure, the term "user" may refer to a viewer who watches an image displayed on an image display device or a person who controls a function or operation of the image display device, and may include a home user, a manager or an installation engineer.

Figure 2:
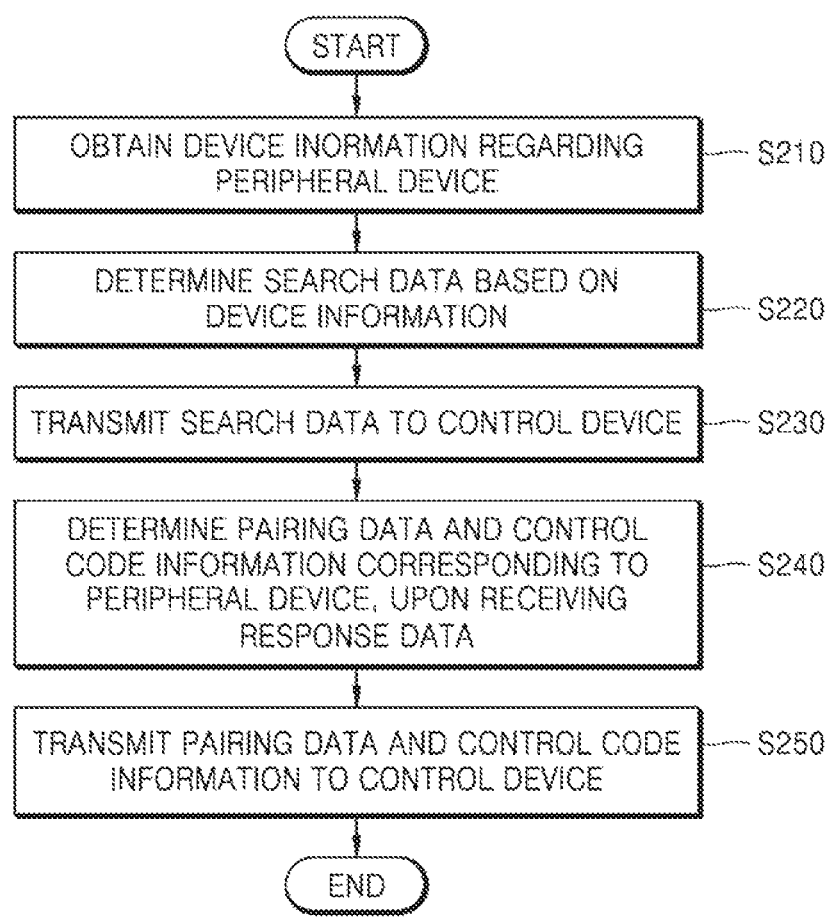
FIG. 2 is a flowchart of a method of operating an image display device, according to an embodiment of the disclosure.

FIG. 2 is a flowchart of a method of operating an image display device, according to an embodiment of the disclosure.

Referring to FIG. 2, the image display device 100 according to an embodiment of the disclosure may obtain device information regarding a peripheral device, in operation S210.

For example, the image display device 100 and the peripheral device 300 may be connected by a high definition multimedia interface (HDMI) cable, and the image display device 100 may receive device information regarding the peripheral device 300 by using an HDMI-Consumer Electronics Control (CEC) or HDMI Info frame. According to an embodiment of the disclosure, the device information regarding the peripheral device 300 may include, but is not limited to, at least one of operational functionalities or characteristics, a device type, a manufacturer, an operator name, or a model name of the peripheral device 300.

The image display device 100 may obtain the device information regarding the peripheral device 300 based on location information regarding a location where the image display device 100 is used. For example, the image display device 100 may obtain information about a peripheral device used in a region where the image display device 100 is located.

The image display device 100 may also obtain the information about the peripheral device based on a user input. For example, the user may directly input a device type, a manufacturer, an operator name, and a model name of the peripheral device to the image display device 100, and the image display device 100 may obtain the information about the peripheral device based on the input information. However, the image display device 100 may obtain the information about the peripheral device using various methods without being limited to the above example.

The image display device 100 according to an embodiment of the disclosure may determine search data about the peripheral device, based on the obtained device information regarding the peripheral device in operation S220.

The image display device 100 according to an embodiment of the disclosure may map at least one of device information regarding a peripheral device supporting the RF4CE, identification information of the peripheral device (e.g., an ID of the peripheral device), search data for searching for the peripheral device, pairing data for performing pairing with the peripheral device, or control code information for controlling the peripheral device, with each other, and store mappings thereof as associated data in a database (DB). For example, the image display device 100 may receive a DB for peripheral devices supporting RF4CE from an external device or an external server and store the DB.

The image display device 100 may determine search data corresponding to device information by using the DB. For example, the image display device 100 may search for device identification information of a peripheral device (e.g., an ID of the peripheral device), mapped to device information, and obtain search data (e.g., discovery raw data of the peripheral device) mapped to device identification information of the peripheral device.

The image display device 100 may receive results of the searching as the search data from the peripheral device, and the search data may be included in the device identification information.

The image display device 100 may transmit the determined search data to the control device 200 in operation S230. For example, the image display device 100 may transmit the search data to the control device 200 via BT or Bluetooth Low Energy (BLE), without limited thereto.

The control device 200 may convert the search data received from the image display device 100 into a signal or a packet in a form corresponding to the peripheral device. The control device 200 may transmit the signal or packet through an RF4CE module (RF4CE transmitter) based on the received search data.

When a peripheral device corresponding to the search data exists near the control device 200, the peripheral device 300 may transmit a response signal (or packet) to the control device 200, upon receiving the signal or packet corresponding to the search data transmitted from the control device 200.

The control device 200 may receive the response signal (or packet) and transmit response data corresponding to the response signal to the image display device 100. The control device 200 may transmit the response data to the image display device 100 via BT or BLE, without limited thereto.

When the image display device 100 receives the response data from the control device 200, the image display device 100 may transmit pairing data and control code information, which correspond to the peripheral device, to the control device 200.

Figure 3:
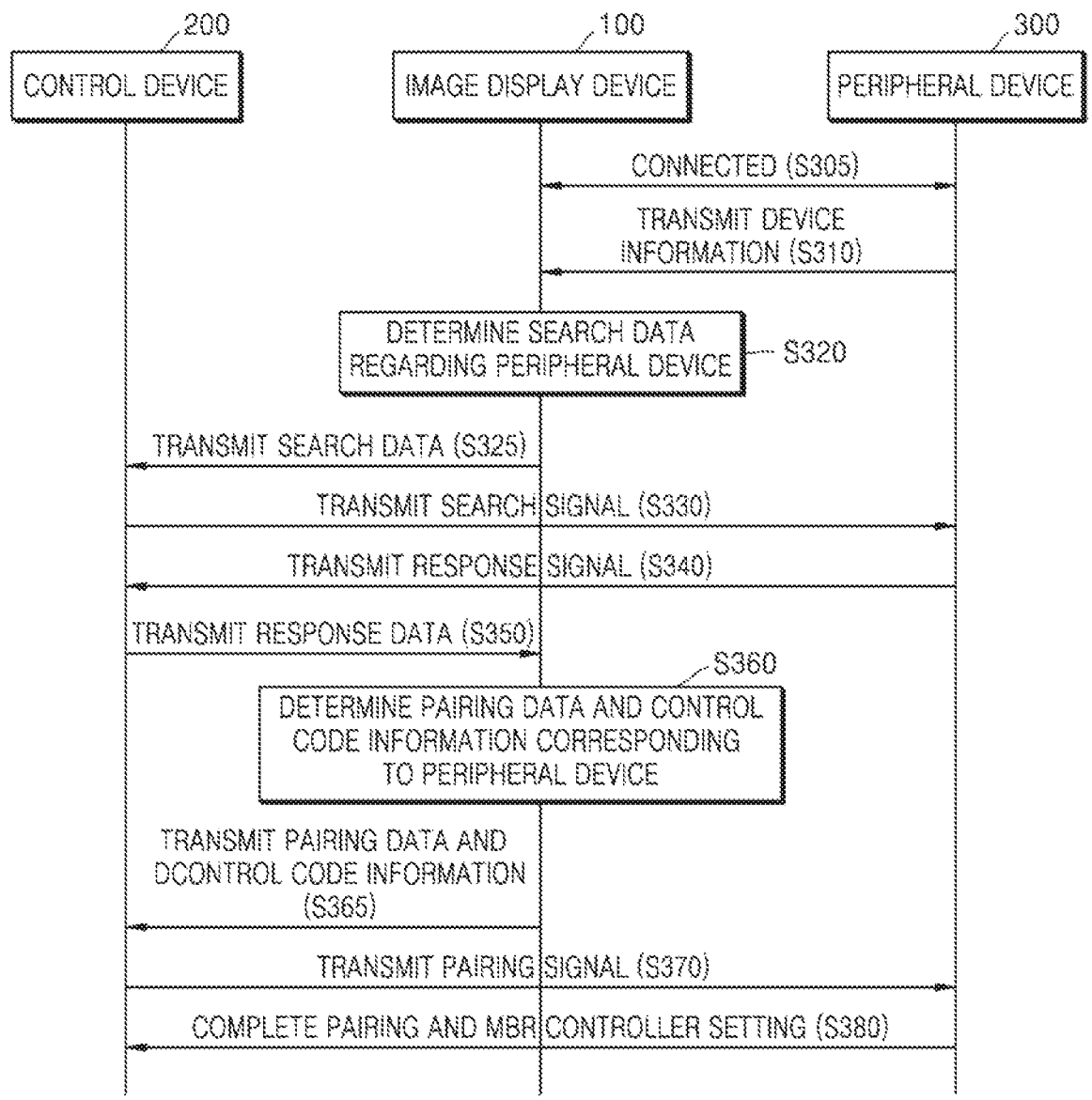
FIG. 3 is a flowchart of a method of setting a multi-brand remote (MBR) controller for controlling an image display device and a peripheral device by using one control device, according to an embodiment of the disclosure.

FIG. 3 is a flowchart of a method of setting a multi-brand remote (MBR) controller for controlling an image display device and a peripheral device by using one control device, according to an embodiment of the disclosure.

Referring to FIG. 3, the image display device 100 and the peripheral device 300 may be connected to each other through a wired/wireless network in operation S305. For example, the image display device 100 and the peripheral device 300 may be connected to each other through an HDMI cable. The image display device 100 and the peripheral device 300 may be connected to each other using wireless communication such as Bluetooth, BLE, ZigBee, Wireless Fidelity (WiFi), etc.

The peripheral device 300 may transmit device information to the image display device 100 in operation S310.

For example, when the peripheral device 300 is connected to the image display device 100 using an HDMI cable, the image display device 100 may receive device information regarding the peripheral device 300 by using the HDMI-CEC or HDMI Info frame. The device information may include, but is not limited to, at least one of functionalities, operating characteristics, a device type, a manufacturer, an operator name, or a model name of the peripheral device 300.

The image display device 100 may determine search data about the peripheral device, based on the device information regarding the peripheral device 300 in operation S320. Operation S320 of FIG. 3 is the same as operation S220 of FIG. 2, and thus a redundant description thereof will be omitted.

The image display device 100 may transmit the search data to the control device 200 in operation S325, and the control device 200 may convert the search data received from the image display device 100 into a signal or a packet in a form corresponding to the peripheral device 300. The control device 200 may transmit the signal or packet through the RF4CE module (RF4CR transmitter) in operation S330.

When a peripheral device corresponding to the search data exists near the control device 200, the peripheral device 300 may receive the signal or packet corresponding to the search data transmitted from the control device 200 and transmit a response signal (or packet) to the control device 200 in operation S340.

The control device 200 may receive the response signal (or packet) and transmit response data corresponding to the response signal to the image display device 100. The control device 200 may transmit the response data to the image display device 100 via BT or BLE, without being limited thereto.

When the image display device 100 receives the response data from the control device 200, the image display device 100 may determine pairing data and control code information, which correspond to the peripheral device 300, in operation S360, and transmit the pairing data and the control code information to the control device 200 in operation S365.

The control device 200 may store the pairing data and control code information received from the image display device 100, and convert the pairing data into a signal or a packet in a form corresponding to the peripheral device. The control device 200 may transmit the signal or packet through the RF4CE module (RF4CR transmitter) in operation S370.

The peripheral device 300 may receive the signal or packet corresponding to the pairing data transmitted from the control device 200 and transmit a response signal (or packet) to the control device 200.

In pairing, for a device that does not require input of an identification code, pairing may be completed by an operation, performed by the peripheral device 300, of receiving a signal or packet corresponding to the pairing data from the control device 200 and transmitting a response signal. When pairing is completed, the control device 200 may complete the MBR controller setting by registering the control code information corresponding to the peripheral device 300, in operation S380. The control device 200 may control the peripheral device 300 by using the registered control code information.

Figure 4:
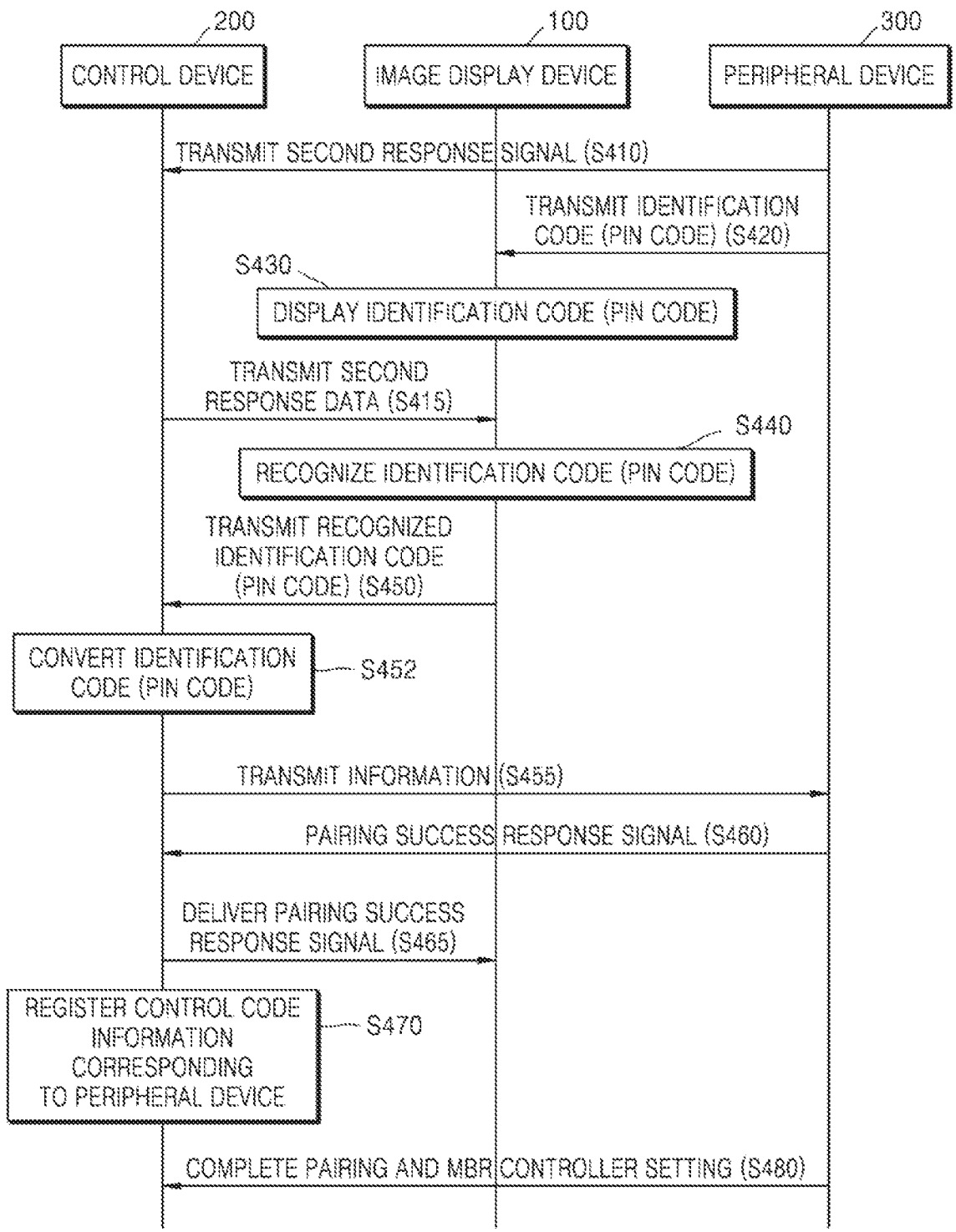
FIG. 4 is a flowchart of a method of setting an MBR controller for controlling an image display device and a peripheral device by using one control device, according to an embodiment of the disclosure.

FIG. 4 is a flowchart of a method of setting a multi-brand remote (MBR) control remote controller for controlling an image display device and a peripheral device by using one control device, according to an embodiment of the disclosure.

Referring to FIG. 4, a control device 200 according to an embodiment of the disclosure may receive information for performing pairing, which includes identification information of a peripheral device, from the image display device 100.

The control device 200 may output search data for pairing based on the information for performing pairing, including the identification information of the peripheral device, received from the image display device 100, in which the search data may include the identification information of the peripheral device.

When the peripheral device 300 receives the search data for pairing corresponding to the peripheral device 300 from the control device 200, the peripheral device 300 may transmit a second response signal to the control device 200 in operation S410.

When the peripheral device 300 receives the search data for pairing corresponding to the peripheral device 300 from the control device 200, the peripheral device 300 may also transmit an image signal including identification code (e.g., a personal identification number (PIN) code) data or an identification code required for pairing to the image display device 100 in operation S420.

The identification code data according to an embodiment of the disclosure may be data used in authentication during pairing between the control device and a peripheral device.

According to an embodiment of the disclosure, when the peripheral device 300 is a device including a display, the peripheral device 300 may display an identification code on the display of the peripheral device 300.

The image display device 100 may display the identification code received from the peripheral device 300 in operation S430, and display an input window for inputting the identification code.

The control device 200 may transmit second response data corresponding to the second response signal received from the peripheral device 300 to the image display device 100 in operation S415.

When the image display device 100 according to an embodiment of the disclosure receives the second response data from the control device 200, the image display device 100 may start image analysis of the image signal received from the peripheral device 300. The image display device 100 may recognize the displayed identification code by analyzing the image signal in operation S440. For example, the image display device 100 may recognize a text, a number, etc., included in the image signal.

The image display device 100 may also start image analysis based on a user input to recognize the identification code.

The image display device 100 may transmit recognized identification code data to the control device 200 in operation S450. In operation S452, the control device 200 may convert the identification code data received from the image display device 100 into a signal or a packet in a form corresponding to the peripheral device 300. The control device 200 may transmit the signal or packet through the RF4CE module (RF4CR transmitter) in operation S455.

The peripheral device 300 may receive the signal or packet corresponding to the identification code data from the control device 200, and transmit a pairing success response signal to the control device 200 in operation S460 when the identification code received as the identification code data matches the identification code transmitted in operation S420 to the image display device 100.

When the control device 200 receives the pairing success response signal from the peripheral device 300, the control device 200 may deliver the pairing success response signal to the image display device 100 in operation S465.

When the control device 200 receives the pairing success response signal from the peripheral device 300, the control device 200 may register control code information corresponding to the peripheral device 300 in operation S470, thus completing MBR controller setting in operation S480. The control device 200 may control the peripheral device 300 by using registered control code information.

Meanwhile, the image display device 100 according to an embodiment of the disclosure may transmit the recognized identification code data to the peripheral device 300.

The peripheral device 300 may transmit a pairing success response signal to the image display device 100 or the control device 200 when the identification code data received from the image display device 100 matches the identification code data transmitted in operation S420 to the image display device 100. The image display device 100 may deliver the pairing success response signal received from the peripheral device 300 to the control device 200, without being limited thereto.

When the control device 200 receives the pairing success response signal from the image display device 100 or the peripheral device 300, the control device 200 may register the control code information corresponding to the peripheral device 300 in operation S470, thus completing MBR controller setting in operation S480. The control device 200 may control the peripheral device 300 by using the registered control code information.

FIGS. 5A through 5E are diagrams referred to for describing a method, performed by an image display device, of setting an MBR controller, according to an embodiment of the disclosure.

The image display device 100 according to an embodiment of the disclosure may provide an MBR controller setting function. As illustrated in FIG. 5A, the image display device 100 may display a device selection menu 510 for selecting a type of a peripheral device for which an MBR controller is set, based on a user input. The device selection menu 510 may include a plurality of items for selecting types of peripheral devices. For example, the plurality of items may include a set-top box item, a Blue ray player item, a home theater item, etc. The device selection menu 510 of FIG. 5A is merely an example, without being limited thereto.

When a type of a peripheral device is selected, a port selection menu 520 for selecting a port connected to a peripheral device may be displayed as illustrated in FIG. 5B. The port selection menu 520 may include a plurality of items for selecting connecting ports included in the image display device 100. For example, the image display device 100 may include a plurality of HDMI ports, and the plurality of items may include items (e.g., HDMI1, HDMI2, and HDMI3) corresponding to the HDMI ports. The image display device 100 may activate and display items corresponding to ports connected to an external device (e.g., a peripheral device) among a plurality of connecting ports.

The peripheral device 300 according to an embodiment of the disclosure may be connected to any one of the image display device 100 and the plurality of HDMI ports through an HDMI cable. The user may select an item corresponding to a port connected to a peripheral device, by determining the port connected to the peripheral device. The image display device 100 may obtain information indicating whether a peripheral device is connected to a plurality of ports and information about the connected peripheral device, and display the obtained information on the port selection menu 520. Thus, the user may easily identify and select the port connected to the peripheral device for which the MBR controller is to be set.

When the image display device 100 according to an embodiment of the disclosure is connected to the peripheral device through the HDMI cable, the image display device 100 may receive device information regarding the peripheral device 300 by using an HDMI-CEC or HDMI Info frame. The device information may include, but is not limited to, at least one of functionalities, operations, capabilities, a device type, a manufacturer, an operator name, or a model name of the peripheral device 300.

Referring to FIG. 5C, the image display device 100 according to an embodiment of the disclosure may display an additional information setting menu 530 for setting additional information. For example, when the image display device 100 fails to obtain device information regarding the peripheral device 300 by using the HDMI-CEC or HDMI Info frame, the image display device 100 may display the additional information setting menu 530, without being limited thereto.

The additional information setting menu 530 may include an item 531 for setting region information regarding a region where the image display device 100 is used and an item 532 for setting a service provider of a peripheral device. The additional information setting menu 530 may also include, but is not limited to, an item for setting information about a manufacturer and a model name of the peripheral device, etc.

The image display device 100 according to an embodiment of the disclosure may also obtain device information about the peripheral device based on the additional information. For example, the image display device 100 according to an embodiment of the disclosure may obtain device information about a peripheral device (e.g., a set-top box) most often used in a region based on the region information, or may obtain the device information about the peripheral device based on the service provider.

When the image display device 100 according to an embodiment of the disclosure obtains the device information regarding the peripheral device, the image display device 100 may perform operations S220 through S250 of FIG. 2. The control device 200 according to an embodiment of the disclosure may transmit a signal or packet corresponding to pairing data, the pair data corresponding to a peripheral device to the peripheral device 300. The peripheral device 300 may transmit an image signal including identification code (e.g., a personal identification number (PIN) code) data or identification code required for pairing to the image display device 100.

The image display device 100 according to an embodiment of the disclosure may display an image including the identification code received from the peripheral device 300.

For example, as illustrated in FIG. 5D, the image display device 100 may display an identification code 540 and an input window 550 for inputting the identification code 540.

In this case, when the control device 200 includes a numeric keypad (or a numeric button), the user may input the identification code displayed on the image display device 100 by using the numeric keypad of the control device 200. When the control device 200 or the image display device 100 includes a voice recognition function, the user may input the numeric code by using a voice signal. When the control device 200 includes a touch pad, the user may input the identification code by using a touch input (e.g., drag & touch). However, the user may input the identification code in various ways without being limited thereto.

Meanwhile, when it is difficult to input the identification code by using the control device 200, the user may select an auto recognition item 560 illustrated in FIG. 5D. The image display device 100 according to an embodiment of the disclosure may start image analysis when an auto recognition function is selected. The image display device 100 may recognize the displayed identification code by analyzing the image. For example, the image display device 100 may recognize a text, a number, etc., included in the image signal.

The image display device 100 may display the user-input identification code or the automatically recognized identification code on the input window 550.

The image display device 100 may transmit recognized identification code data to the control device 200. The control device 200 may convert the identification code data received from the image display device 100 into a signal or a packet formatted for recognition by the peripheral device, based on control code information corresponding to the peripheral device.

The peripheral device 300 may receive the signal or packet corresponding to the identification code data from the control device 200, and transmit a pairing success response signal to the control device 200 when the identification code received as the identification code data matches the identification code transmitted to the image display device 100, and deliver the pairing success response signal to the image display device 100 upon receiving the pairing success response signal.

Thus, the image display device 100 may display an MBR controller setting complete message 570 as shown in FIG. 5E.

Upon completion of MBR controller setting, the control device 200 may register the control code information corresponding to the peripheral device 300 and control the peripheral device 300 by using the registered control code information.

When a plurality of peripheral devices are connected to the image display device 100, a device addition item 580 may be selected to perform MBR controller setting for other peripheral devices in the same manner.

FIG. 5F is a diagram referred to for describing a method, performed by an image display device, of controlling a peripheral device by using an MBR controller, according to an embodiment of the disclosure.

Referring to FIG. 5F, the image display device 100 according to an embodiment of the disclosure may complete MBR controller setting for a set-top box (STB) in the manner described with reference to FIGS. 5A through 5E, in which the set-top box may be a peripheral device connected to an HDMI port 1 (HDMI 1).

The image display device 100 may also display an external input menu screen 590 based on a user input. The external input menu screen 590 may include an item indicating an external device (e.g., the STB) connected to the image display device 100 or an item indicating an interface for connecting the image display device 100 with the external device.

The image display device 100 may transmit information about the STB connected to the HDMI port 1 (HDMI 1) to the control device 200, upon receiving an input for selecting the HDMI port 1 (HDMI 1).

The control device 200 according to an embodiment of the disclosure may switch a wireless communicator operating in a power-saving mode into an active state, upon receiving the information about the STB from the image display device 100.

The control device 200 may also receive a user input for controlling the STB. The control device 200 may convert the user input into a control signal or a packet in a format corresponding to a format recognized by the STB, by using control code information regarding the STB, stored in a storage. The control device 200 may transmit the converted control signal or packet to the STB by using the wireless communicator. Thus, the user may control the STB by using the set MBR controller.

FIG. 6 illustrates an image display device, a control device, and an Internet of Things (IoT) device, according to an embodiment of the disclosure.

Referring to FIG. 6, the image display device 100 may be connected to one or more IoT devices 601, 602, 603, and 604 through wired/wireless communication.

The IoT device according to an embodiment of the disclosure may be a general device (or object) applied to IoT. For example, the IoT device may include a temperature sensor, a humidity sensor, a sound sensor, a motion sensor, a proximity sensor, a gas detection sensor, a heat detection sensor, a refrigerator, an air conditioner, a CCTV, a laundry machine, a vacuum cleaner, an oven, a dehumidifier, an electric light, a fire alarm, etc. However, the IoT device is not limited to the examples.

The control device 200 according to an embodiment of the disclosure may be set as an MBR controller and thus may control not only the image display device 100, but also the one or more IoT devices 601, 602, 603, and 604 connected to the image display device 100. The IoT device according to an embodiment of the disclosure may be a device that supports ZigBee RF4CE (hereinafter, RF4CE).

The control device 200 according to an embodiment of the disclosure may perform pairing with the one or more IoT devices 601, 602, 603, and 604, and control the one or more IoT devices 601, 602, 603, and 604 with the RF4CE scheme by using the control code information regarding the one or more IoT devices 601, 602, 603, and 604 upon completion of pairing.

This pairing will be described in more detail with reference to FIGS. 7A through 8B.

FIGS. 7A and 7B are diagrams referred to for describing a method, performed by an image display device, of setting an MBR controller for an IoT device, according to an embodiment of the disclosure.

The image display device 100 according to an embodiment of the disclosure may provide an MBR controller setting function for the IoT devices. As illustrated in FIG. 7A, the image display device 100 may display a device selection menu 710 for selecting a type of an IoT device for which an MBR controller is set, based on a user input. The device selection menu 710 may include a plurality of items indicating a type of an IoT device connected to the image display device 100. For example, the plurality of items may include items indicating a robot cleaner, an air conditioner, a refrigerator, a laundry machine, etc. The device selection menu 710 of FIG. 7A is merely an example, without being limited thereto.

The plurality of items may include a model name, a manufacturer name, etc., of the IoT device. The image display device 100 may obtain the model name or the manufacturer name of the IoT device based on the user input, or may receive device information about the IoT device from the connected IoT device.

Referring to FIG. 7B, the image display device 100 according to an embodiment of the disclosure may display an additional information setting menu 750 for setting additional information. For example, when the image display device 100 fails to obtain device information regarding the IoT device, the image display device 100 may display the additional information setting menu 750, without being limited thereto.

The additional information setting menu 750 may also include, but is not limited to, an item for setting information about a manufacturer and a model name of the IoT device, etc.

The image display device 100 according to an embodiment of the disclosure may also obtain device information about the IoT device based on the additional information.

When the image display device 100 according to an embodiment of the disclosure obtains the device information about the IoT device, the image display device 100 may determine search data corresponding to the IoT device based on IoT device information and transmit the determined search data to the control device 200. The control device 200 may identify the corresponding IoT device based on the search data received from the image display device 100, and perform pairing with the identified IoT device. A method of performing pairing with a peripheral device has been described in detail with reference to FIGS. 3 and 4, and may be equally applied to the IoT device. Thus, a redundant description will be omitted.

The control device 200 may receive control code information corresponding to the IoT device from the image display device 100. Upon completion of pairing between the control device 200 and the IoT device, the control device 200 may register the control code information corresponding to the IoT device and control the IoT device by using the registered control code information.

Figure 8B:
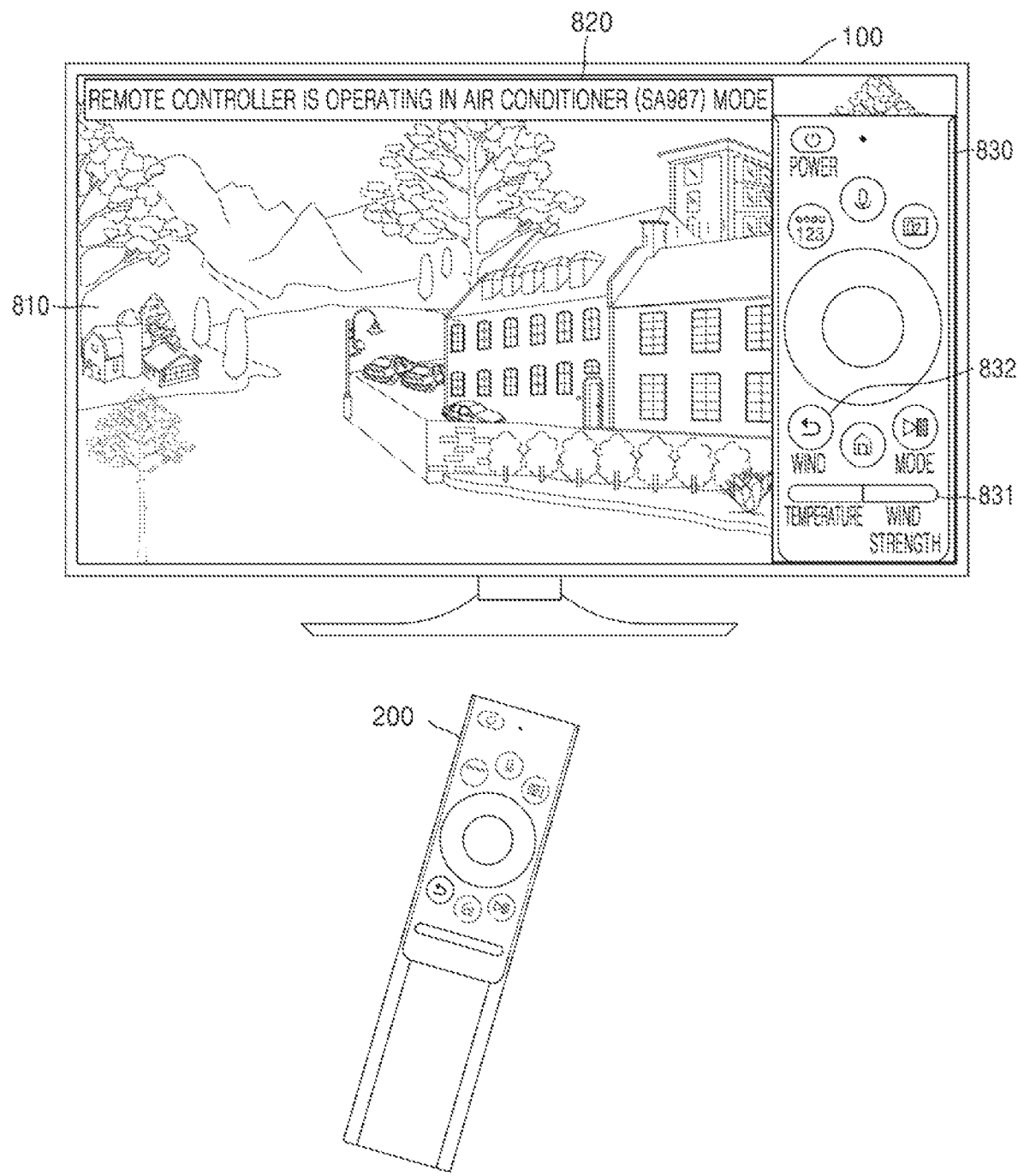

FIGS. 8A and 8B are diagrams referred to for describing a method of controlling an IoT device by using a control device, according to an embodiment of the disclosure.

Referring to FIG. 8A, the image display device 100 according to an embodiment of the disclosure may display broadcasting content 810. When the user desires to control an air conditioner connected to the image display device 100 by using the control device 200 while watching the broadcasting content 810, the control device 200 may transmit an air conditioner control mode entry command to the image display device 100 based on a user input.

For example, the control device 200 may transmit the air conditioner control mode entry command to the image display device 100, upon receiving an input of a particular key (or button) (e.g., a key or button corresponding to air conditioner control mode entry) included in the control device 200. When the control device 200 includes a voice recognition function, the control device 200 may transmit the air conditioner control mode entry command to the image display device 100 based on a user's voice signal. However, the disclosure is not limited to this example.

When the image display device 100 operates in an air conditioner control mode, the image display device 100 may display a message 820 indicating that the image display device 100 operates in an air conditioner control mode, as illustrated in FIG. 8B. The image display device 100 may display a remote controller guide screen 830 in which a key included in the control device 200 is matched to the air conditioner control function.

The remote controller guide screen 830 according to an embodiment of the disclosure may include items indicating keys included in the control device 200 and show air conditioner control functions assigned to the keys. For example, the remote controller guide screen 830 may include a first item 831 indicating a first key included in the control device 200 and a text indicating that a temperature control function is assigned to the first item 831. The remote controller guide screen 830 may also include a second item 832 indicating a second key and a text indicating that a wind direction setting function is assigned to the second item 832.

The image display device 100 may also continuously display the broadcasting content 810 while operating in the air conditioner control mode, and display the remote controller guide screen 830 on a partial region of the display in a way not to disturb displaying of the broadcasting content 810.

Figure 9:
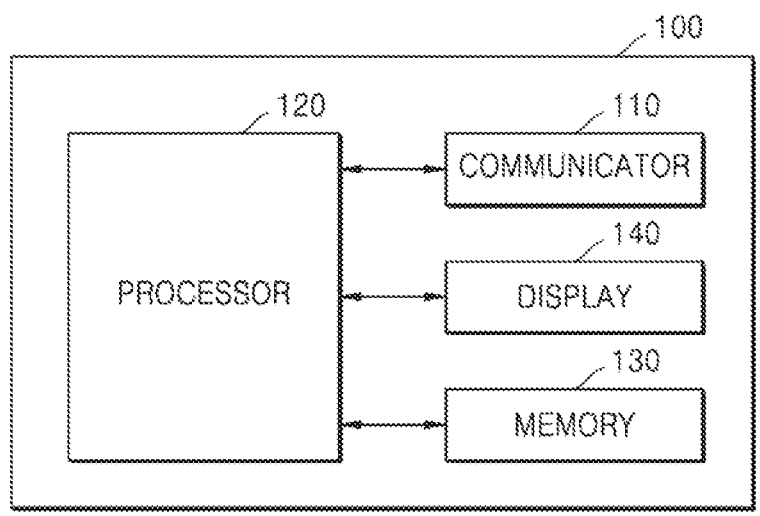
FIG. 9 is a block diagram of an image display device according to an embodiment of the disclosure.

FIG. 9 is a block diagram of an image display device according to an embodiment of the disclosure.

Referring to FIG. 9, the image display device 100 according to an embodiment of the disclosure may include a communicator 110, a processor 120, a memory 130, and a display 140.

The communicator 110 according to an embodiment of the disclosure may transmit data to and receive data from an external device (e.g., a control device, a peripheral device, etc.) under control of the processor 120.

The communicator 110 may transmit and receive data or a signal by using at least one of a wireless local area network (WLAN) (for example, Wireless Fidelity (Wi-Fi), Bluetooth, wired Ethernet, infrared (IR), Bluetooth Low Energy (BLE), ultrasonic waves, ZigBee, or HDMI, according to capability and structure of the image display device 100.

The communicator 110 according to an embodiment of the disclosure may transmit data to and receive data or a signal from a peripheral device through an HDMI cable. The communicator 110 may transmit data to and receive data or a signal from the peripheral device or the control device, by using wireless communication such as Bluetooth, BLE, ZigBee, Wi-Fi, etc.

The communicator 110 may receive device information regarding the peripheral device by using HDMI-CEC or an HDMI Info frame. According to an embodiment of the disclosure, the device information regarding the peripheral device may include, but is not limited to, at least one of a device type, a manufacturer, an operator name, or a model name of the peripheral device.

The processor 120 according to an embodiment of the disclosure may execute at least one program stored in the memory 130. The processor 120 may include a single core, a dual core, a triple core, a quad core, and a core of a multiple thereof. The processor 120 may also include a plurality of processors. For example, the processor 120 may be implemented with a main processor and a sub processor which operates in a sleep mode.

The memory 130 according to an embodiment of the disclosure may store various data, programs, or applications for driving and controlling the image display device 100.

The programs stored in the memory 130 may include at least one computer-readable instruction. The programs or applications stored in the memory 130 may be executed by the processor 120.

The processor 120 according to an embodiment of the disclosure may determine search data regarding the peripheral device based on the device information regarding the peripheral device, by executing at least one instruction of the computer program loaded from the memory 130. When the processor 120 receives response data from the control device 200, the image display device 100 may determine pairing data and control code information, which correspond to the peripheral device.

The processor 120 may control an image including an identification code received from the peripheral device to be displayed, and analyze the displayed image to recognize the identification code. The processor 120 may control the recognized identification code to be displayed on the display and the recognized identification code to be transmitted to the peripheral device or the control device.

The display 140 according to an embodiment of the disclosure may convert an image signal, a data signal, an on-screen display (OSD) signal, a control signal, or the like, processed by the processor 120, to generate a driving signal. The display 140 may be implemented with a plasma display panel (PDP), a liquid crystal display (LCD), an organic light-emitting diode (OLED), a flexible display, or the like, and may also be implemented with a three-dimensional (3D) display. The display 140 may include a touch screen and thus may be used as an input device as well as an output device.

The display 140 according to an embodiment of the disclosure may display various menu screens for setting an MBR remote controller. The display 140 may also display an image including an identification code received from the peripheral device, and display the identification code recognized from the image. As illustrated in FIG. 8B, the display 140 may display a remote controller guide screen for controlling the peripheral device. However, the disclosure is not limited to this example.

Figure 10:
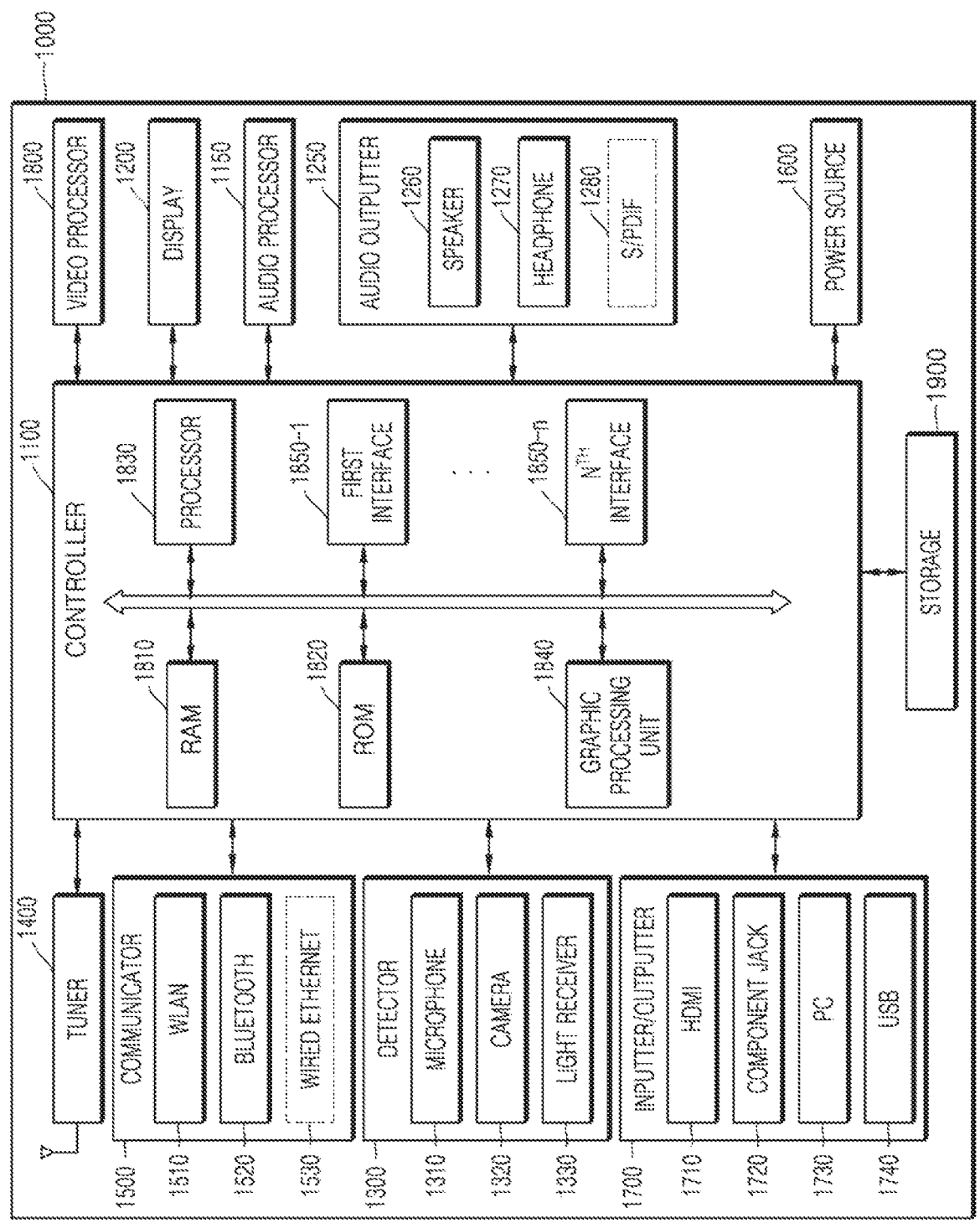
FIG. 10 is a block diagram of an image display device according to another embodiment of the disclosure.

FIG. 10 is a block diagram of an image display device according to another embodiment of the disclosure. An image display device 1000 shown in FIG. 10 may be an example of the image display device 100 shown in FIG. 1.

Referring to FIG. 10, an image display device 1000 according to an embodiment of the disclosure may include a tuner 1400, a controller 1100, a display 1200, a communicator 1500, a detector 1300, an inputter/outputter 1700, a video processor 1800, an audio processor 1150, a storage 1900, and a power source 1600.

The communicator 1500 of FIG. 10 and the inputter/outputter 1700 (input/output unit, I/O) of FIG. 10 may correspond to the communicator 110 of FIG. 9, the controller 1100 of FIG. 10 may correspond to the processor 120 of FIG. 9, the storage 1900 of FIG. 10 may correspond to the memory 130 of FIG. 9, and the display 1200 of FIG. 10 may correspond to the display 140 of FIG. 9.

The tuner 1400 may select a frequency of a channel the image display device 1000 is to receive from among many electric wave components by tuning the frequency through amplification, mixing, resonance, or the like with respect to a broadcast signal received via wires or wirelessly. The broadcast signal may include audio, video, and additional information (for example, an electronic program guide (EPG)).

The tuner 1400 may receive a broadcast signal in a frequency band corresponding to a channel number based on a user input (for example, a control signal received from a control device, such as a channel number input, a channel up-down input, and a channel input on an EPG screen).

The tuner 1400 may receive a broadcast signal from various sources such as terrestrial broadcasting, cable broadcasting, satellite broadcasting, Internet broadcasting, and so forth. The tuner 1400 may receive a broadcast signal from a source such as analog broadcasting, digital broadcasting, or the like.

The communicator 1500 according to an embodiment of the disclosure may transmit and receive data or a signal from an external device or a server under control of the controller 1100. The controller 1100 may transmit/receive contents to/from an external device connected through the communicator 1500, download an application from the external device, or browse the web.

The communicator 1500 may transmit and receive data or a signal by using at least one of a WLAN 1510 (e.g., Wi-Fi), Bluetooth 1520, or wired Ethernet 1530, according to capability and structure of the image display device 1000.

The communicator 1500 according to an embodiment of the disclosure may communicate with the control device according to an embodiment of the disclosure, by using short-range communication. For example, the communicator 1500 may transmit data to and receive data or a signal from the control device by using Bluetooth, Wi-Fi, NFC, IR, ZigBee, etc.

The communicator 1500 may receive a control command for controlling an operation of the image display device from the control device, and may perform operations according to the control command.

The video processor 1800 may process video data received by the image display device 1000. The video processor 1800 may perform various image processing, such as decoding, scaling, noise filtering, frame rate conversion, resolution conversion, etc., with respect to video data.

The detector 1300 may sense a user's voice, a user's image, or a user's interaction, and may include a microphone 1310, a camera 1320, and a light receiver 1330.

The microphone 1310 may receive an uttered voice of the user. The microphone 1310 may convert the received voice into an electric signal and output the electric signal to the controller 1100. The user's voice may include, for example, a voice corresponding to a menu or a function of the image display device 1000.

The camera 1320 may receive an image (e.g., a continuous frame) corresponding to a user's motion including a gesture in a camera recognition range. The controller 1100 may select a menu displayed on the image display device 1000 by using a recognition result of a received motion or perform control corresponding to the recognition result of the received motion.

A light receiver 1330 may receive a light signal (including a control signal) received from an external control device through a lighting window of a bezel of the display 1200. The light receiver 1330 may receive a light signal corresponding to a user input (e.g., a touch, a press, a touch gesture, a voice, or a motion) from a control device. A control signal may be extracted from the received light signal under control of the controller 1100.

The inputter/outputter (I/O unit) receives video (e.g., moving images, etc.), audio (e.g., a voice, music, etc.), and additional information (e.g., an EPG, etc.) from an external source outside the image display device 1000, under control of the controller 1100. The inputter/outputter may include one of an HDMI port 1710, a component jack 1720, a PC port 1730, and a USB port 1740. The inputter/outputter may include a combination of the HDMI port 1710, the component jack 1720, the PC port 1730, and the USB port 1740.

The controller 1100 may control an overall operation of the image display device 1000 and a signal flow among internal elements of the image display device 1000, and process data. The controller 1100 executes an operating system (OS) and various applications stored in the storage 1900, when a user input is input or a preset and stored condition is satisfied.

The controller 1100 may include a random access memory (RAM) 1810 that stores a signal or data input from an external source or is used as a storage region corresponding to various tasks performed by the image display device 1000, a read only memory (ROM) 1820 having stored therein a control program for controlling the image display device 1000, and a processor 1830.

A graphic processing unit (GPU) 1840 may generate a screen including various objects such as an icon, an image, a text, etc., by using a calculator and a renderer. The calculator may calculate an attribute value such as coordinates, shapes, sizes, colors, etc., of respective objects based on a layout of the screen by using the user's input sensed by the detector 1300. The renderer may generate a screen of various layouts including an object based on the attribute value calculated by the calculator. The screen generated by the renderer may be displayed in a display region of the display 1200.

First through $n^{th}$ interfaces 1850-1 to 1850-n may be connected to the above-described elements. One of the interfaces may be a network interface connected to an external device over a network.

The RAM 1810, the ROM 1820, the processor 1830, the GPU 1840, and the first through $n^{th}$ interfaces 1850-1 to 1850-n may be interconnected through at least one internal bus 1860.

In the current embodiment of the disclosure, the term "controller of the image display device" may include the processor 1830, the ROM 1820, and the RAM 1810.

The display 1200 converts an image signal, a data signal, an OSD signal, a control signal, or the like, processed by the controller 1100, to generate a driving signal. The display 1200 may be implemented with a PDP, an LCD, an OLED, a flexible display, or the like, and may also be implemented with a 3D display. The display 1200 may include a touch screen and thus may be used as an input device as well as an output device.

The audio processor 1150 may process audio data. The audio processor 1150 may perform various processing such as decoding, amplification, noise filtering, etc., with respect to the audio data. Meanwhile, the audio processor 1150 may include a plurality of audio processing modules for processing audio corresponding to a plurality of contents.

The audio outputter 1250 may output audio included in a broadcast signal received through the tuner 1400 under control of the controller 1100. The audio outputter 1250 may output audio (e.g., voice, sound, etc.) input through the communicator 1500 or the inputter/outputter 1700. The audio outputter 1250 may output audio stored in the storage 1900 under control of the controller 1100. The audio outputter 1250 may include at least one of a speaker 1260, a headphone output terminal 1270, or a Sony/Phillips digital interface (S/PDIF) output terminal 1280. The audio outputter 1250 may include a combination of the speaker 1260, the headphone output terminal 1270, and the S/PDIF output terminal 1280.

The power source 1600 may supply power, which is input from an external power source, to the internal elements of the image display device 1000, under control of the controller 1100. The power source 1600 supplies power, which is output from at least one battery included in the image display device 1000, to the internal elements, under control of the controller 1100.

The storage 1900 may store various data, programs, or applications for driving and controlling the image display device 1000 under control of the controller 1100. The storage 1900 may include a broadcasting reception module, a channel control module, a volume control module, a communication control module, a voice recognition module, a motion recognition module, a light reception module, a display control module, an audio control module, an external input control module, a power control module, a power control module of an external device connected wirelessly (for example, by Bluetooth), a voice database (DB), or a motion DB. Modules and DBs of the storage 1900 may be implemented in the form of software to perform a control function of broadcasting reception, a channel control function, a volume control function, a communication control function, a voice recognition function, a motion recognition function, a light reception control function, a power control function, or a power control function of an external device connected wirelessly (for example, by Bluetooth) in the image display device 1000. The controller 1100 may perform respective functions by using the foregoing software stored in the storage 1900.

Meanwhile, the block diagrams of the image display devices 100 and 1000 shown in FIGS. 9 and 10, respectively, are block diagrams for an embodiment of the disclosure. Elements of the block diagram may be integrated, added, or omitted depending on the specifications of the image display devices 100 and 1000 implemented actually. That is, when necessary, two or more elements may be integrated into one element or one element may be divided into two or more elements. A function executed in each element (or module)

is intended to describe embodiments of the disclosure, and a detailed operation or device thereof does not limit the scope of the disclosure.

Figure 11:
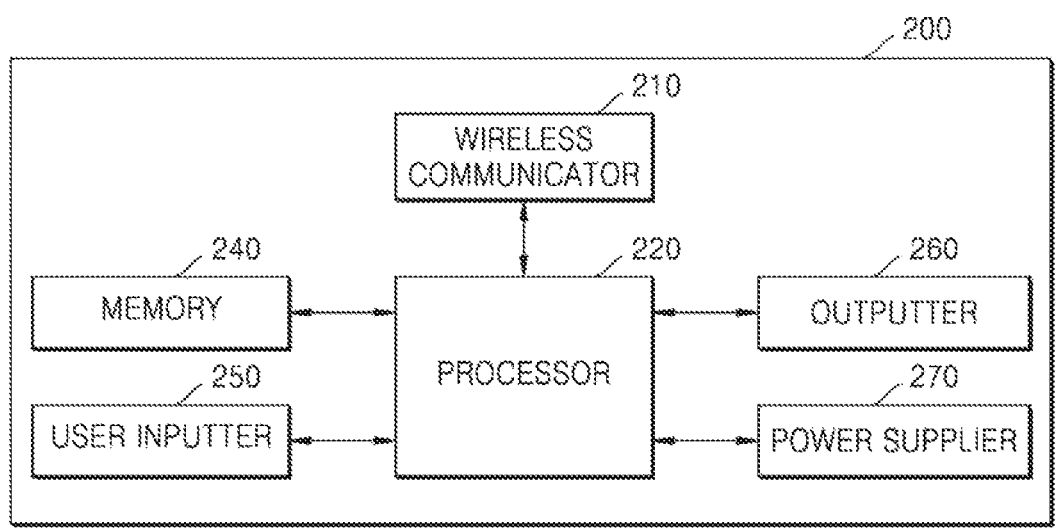
FIG. 11 is a block diagram of a control device according to an embodiment of the disclosure.

FIG. 11 is a block diagram of a control device according to an embodiment of the disclosure.

Referring to FIG. 11, the control device 200 according to an embodiment of the disclosure may include a wireless communicator 210, a processor 220, a memory 240, a user inputter 250, an outputter 260, and a power supplier 270.

The wireless communicator 210 according to an embodiment of the disclosure may transmit data to and receive a signal from the image display device 100 or the peripheral device 300 by using a WLAN (e.g., Wi-Fi, Bluetooth, BLE, ultrasonic waves, etc.).

The wireless communicator 210 may include an IR module capable of transmitting to and receiving a signal from the image display device 100 according to IR communication standards. For example, the control device 200 may transmit a command regarding power on/off, change, volume change, etc., to the image display device 100 through the IR module, depending on a need.

The wireless communicator 210 may include an RF4CE module capable of transmitting and receiving a signal to and from the peripheral device 300 according to ZigBee RF4CE standards. For example, the wireless communicator 210 may receive search data corresponding to the peripheral device 300 from the image display device 100, convert the received search data into a signal or a packet in a form corresponding to the peripheral device 300, and transmit the signal or the packet to the peripheral device 300 through an RF4CE module.

The wireless communicator 210 may convert pairing data received from the image display device into a signal or a packet in a form corresponding to the peripheral device 300, and transmit the signal or the packet to the peripheral device 300 through the RF4CE module.

The wireless communicator 210 may receive a response signal corresponding to the search data and a response signal corresponding to the pairing data from the peripheral device 300, and transmit response data corresponding to the received response signals to the image display device 100. However, the disclosure is not limited to this example.

The memory 240 according to an embodiment of the disclosure may store various types of programs necessary for control or operations of the control device 200, application data, and so forth.

The memory 240 according to an embodiment of the disclosure may store control code information corresponding to peripheral devices. The programs stored in the memory 240 may include at least one instruction. The programs (for example, at least one instruction) or applications stored in the memory 240 may be executed by the processor 220.

The processor 220 controls overall operations of the control device 200. The processor 220 may transmit a signal corresponding to key manipulation of the user inputter 250 to the image display device 100 or the peripheral device 300 through the wireless communicator 210. For example, the processor 220 may receive a user input signal, convert the received signal into a control signal corresponding to the peripheral device by using control code information corresponding to the peripheral device, and transmit the control signal to the peripheral device by using the wireless communicator 210.

The user inputter 250 may include a keypad, buttons, a touch pad, or a touch screen. The user may input a command related to the image display device 100 to the control device 200 by manipulating the user inputter 250. When the user inputter 250 includes a hard key button, the user may input a command related to the image display device 100 or the peripheral device 300 to the control device 200 by pushing the hard key button. When the user inputter 250 includes a touch screen, the user may input a command related to the image display device 100 or the peripheral device 300 to the control device 200 by touching a soft key of the touch screen.

The outputter 260 may output an image or voice signal corresponding to manipulation of the user inputter 250 or a signal received by the image display device 100 or the peripheral device 300. Through the outputter 260, the user may recognize whether the user inputter 250 is manipulated or the image display device 100 or the peripheral device 300 is controlled.

For example, the outputter 260 may include an LED module that is lighted on or off when the user inputter 250 is manipulated or a signal is transmitted to or received from the image display device 100 through the wireless communicator 210, a vibration module configured to generate vibration, an audio output module configured to output audio, or a display module configured to output an image.

The power supplier 270 may supply power to the control device 200. The power supplier 270 may stop power supply when the control device 200 is not manipulated by a user for a specific period of time, thereby preventing the waste of the power. The power supplier 270 may resume power supply when a specific key included in the control device 200 is manipulated.

Meanwhile, the block diagram of the control device 200 shown in FIG. 11 is a block diagram for an embodiment of the disclosure. Elements of the block diagram may be integrated, added, or omitted depending on the specifications of the control device 200 implemented actually. That is, when necessary, two or more elements may be integrated into one element or one element may be divided into two or more elements. A function executed in each element (or module) is intended to describe embodiments of the disclosure, and a detailed operation or device thereof does not limit the scope of the disclosure.

The operation method of the image display device according to an embodiment of the disclosure may be implemented in the form of program commands that can be executed through various computer components and recorded in a computer-readable recording medium. The computer-readable recording medium may include a program command, a data file, a data structure and the like solely or in a combined manner. The program command recorded in the computer-readable recording medium may be a program command specially designed and configured for the present embodiments of the disclosure or a program command known to be used by those skilled in the art of the computer software field. Examples of the computer-readable recording medium may include magnetic media such as hard disk, floppy disk, and magnetic tape, optical media such as compact disk read only memory (CD-ROM) and digital versatile disk (DVD), magneto-optical media such as floptical disk, and a hardware device especially configured to store and execute a program command, such as read only memory (ROM), random access memory (RAM) and flash memory, etc. Further, examples of the program command include a machine language code created by a complier and a high-level language code executable by a computer using an interpreter.

The operation method of the image display device according to the embodiments of the disclosure may be included and provided in a computer program product. The computer program product may be traded as a product between a seller and a buyer.

The computer program product may include a software (S/W) program and a non-transitory computer-readable recording medium in which the S/W program is stored. For example, the computer program product may include a product (e.g., a downloadable application) in the form of a S/W program electronically distributed through a manufacturer or the image display device or an electronic market (e.g., Google Play Store or App Store). For the electronic distribution, at least a portion of the S/W program may be stored in a storage medium or temporarily generated. In this case, the storage medium may be a storage medium of a server in the manufacturer or the electronic market or a relay server that temporarily stores the S/W program.

The computer program product may include a storage medium of a server or a storage medium of a client device, in a system including the server and the client device. Alternatively, when there is a third device (e.g., a smart phone) communicating with the server or the client device, the computer program product may include a storage medium of the third device. Alternatively, the computer program product may include a S/W program itself, which is transmitted from the server to the client device or the third device or transmitted from the third device to client device.

In this case, one of the server, the client device, and the third device may execute the computer program product to perform the method according to the embodiments of the disclosure. Alternatively, two or more of the server, the client device, and the third device may execute the computer program product to execute the method according to the embodiments of the disclosure in a distributed manner.

For example, a server (e.g., a cloud server or AI server, etc.) may execute a computer program product stored in the server to control the client device communicating with the server to perform the method according to the embodiments of the disclosure.

The image display device according to an embodiment of the disclosure may make it convenient to set an MBR controller for controlling a peripheral device using ZigBee RF4CE.

While the disclosure has been shown and described with reference to certain example embodiments of the disclosure, the scope of the disclosure is not limited to the description and also includes various modifications and improvements made by those of ordinary skill in the art using the concept of the disclosure defined in the appended claims.

What is claimed is:

1. An image display device comprising:
a memory storing at least one instruction;
a wireless communicator configured to communicate with an external control device controlling the image display device; and
a processor, wherein the processor by executing the at least one instruction stored in the memory is configured to:
obtain device identification information corresponding to an external device connected to the image display device;
control the wireless communicator to transmit, to the external control device, search data for the external control device to perform a discovering process for discovering the external device based on the device identification information; and
based on the external device being discovered by the external control device using the search data, control the wireless communicator to transmit, to the external control device, pairing data for the external control device to perform a pairing with the external device, and control code information corresponding to the external device,
in response to a predefined input being received from the external control device, control to display a guide screen corresponding to the external device,
wherein the guide screen guides to execute at least one function of the external device using the external control device.

2. The image display device of claim 1, wherein the predefined input includes input for a key or a button included in the external control device.

3. The image display device of claim 1, wherein the guide screen includes at least one item indicating at least one key included in the external control device, and indicates the at least one function corresponding to the external device and assigned to the at least one key.

4. The image display device of claim 3, wherein the at least one item includes a first item indicating a first key included in the external control device, and a second item indicating a second key included in the external control device, and
wherein the guide screen includes a first text indicating that a first function is assigned to the first item and a second text indicating that a second function is assigned to the second item.

5. The image display device of claim 1, wherein the processor by executing the at least one instruction stored in the memory is further configured to control to display a message indicating that the image display device operates in an external device control mode.

6. The image display device of claim 1, wherein the processor by executing the at least one instruction stored in the memory is further configured to control to display a broadcasting content while operating in an external device control mode.

7. The image display device of claim 1, wherein the device identification information comprises at least one of a manufacturer, an operator name, or a model name of the external device.

8. The image display device of claim 1, wherein the memory comprises a database storing in association the device identification information, the search data, the pairing data, and the control code information, which correspond to each of a plurality of external devices.

9. The image display device of claim 1, further comprising a display,
wherein the processor by executing the at least one instruction stored in the memory is further configured to:
control the display to display an image based on an image signal received from the external device;
extract identification code data by analyzing the image signal; and
control the wireless communicator to transmit the identification code data to the external control device or the external device.

10. The image display device of claim 9, wherein the identification code data comprises data used for authentication during pairing between the external control device and the external device.

11. A method operating an image display device, the method comprising:

obtaining device identification information corresponding to an external device connected to the image display device;

transmitting, to an external control device, search data for the external control device to perform a discovering process for discovering the external device based on the device identification information;

based on the external device being discovered by the external control device using the search data, transmitting, to the external control device, pairing data for the external control device to perform a pairing with the external device, and control code information corresponding to the external device; and in response to a predefined input being received from the external control device, displaying a guide screen corresponding to the external device, wherein the guide screen guides to execute at least one function of the external device using the external control device.

12. The method of claim 11, wherein the predefined input includes input for a key or a button included in the external control device.

13. The method of claim 11, wherein the guide screen includes at least one item indicating at least one key included in the external control device, and indicates the at least one function corresponding to the external device and assigned to the at least one key.

14. The method of claim 13, wherein the at least one item includes a first item indicating a first key included in the external control device, and a second item indicating a second key included in the external control device, and wherein the guide screen includes a first text indicating that a first function is assigned to the first item and a second text indicating that a second function is assigned to the second item.

15. The method of claim 11, further comprising:
displaying a message indicating that the image display device operates in an external device control mode.

16. The method of claim 11, further comprising:
displaying a broadcasting content while operating in an external device control mode.

17. The method of claim 11, wherein the device identification information comprises at least one of a manufacturer, an operator name, or a model name of the external device.

18. The method of claim 11, further comprising:
storing in association the device identification information, the search data, the pairing data, and the control code information, which correspond to each of a plurality of external devices.

19. The method of claim 11, further comprising:
displaying an image based on an image signal received from the external device;
extracting identification code data by analyzing the image signal; and
transmitting the identification code data to the external control device or the external device.

20. The method of claim 19, wherein the identification code data comprises data used for authentication during pairing between the external control device and the external device.

* * * * *